US007528845B2

(12) United States Patent
Ozawa et al.

(10) Patent No.: US 7,528,845 B2
(45) Date of Patent: May 5, 2009

(54) IMAGE PROCESSING APPARATUS AND IMAGE PROCESSING METHOD

(75) Inventors: Kaitaku Ozawa, Amagasaki (JP); Yoshikazu Ikenoue, Itami (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 659 days.

(21) Appl. No.: 11/022,821

(22) Filed: Dec. 28, 2004

(65) Prior Publication Data
US 2006/0101156 A1  May 11, 2006

(30) Foreign Application Priority Data
Nov. 10, 2004   (JP) .............................. 2004-326337

(51) Int. Cl.
*G09G 5/00* (2006.01)
(52) U.S. Cl. ...................... 345/619; 358/402; 358/405
(58) Field of Classification Search ................. 345/619; 358/405, 402
See application file for complete search history.

(56) References Cited

U.S. PATENT DOCUMENTS

| 5,796,494 | A |  | 8/1998 | Asano |  |
|---|---|---|---|---|---|
| 5,905,582 | A |  | 5/1999 | Hirai et al. |  |
| 6,005,677 | A |  | 12/1999 | Suzuki |  |
| 6,469,798 | B1 |  | 10/2002 | Toyoda et al. |  |
| 6,820,083 | B1 | * | 11/2004 | Nagy et al. | ...................... 707/9 |
| 2003/0179871 | A1 | * | 9/2003 | Ito et al. | ................... 379/93.24 |
| 2003/0214679 | A1 | * | 11/2003 | Ishikawa | ..................... 358/434 |
| 2005/0071500 | A1 | * | 3/2005 | Tonegawa | .................... 709/236 |

FOREIGN PATENT DOCUMENTS

| JP | 11-146174 |  | 5/1999 |
|---|---|---|---|
| JP | 11-225260 |  | 8/1999 |
| JP | 2001-077997 |  | 3/2001 |
| JP | 2001-333246 |  | 11/2001 |
| JP | 2001333246 | A * | 11/2001 |
| JP | 2003-259076 |  | 9/2003 |
| JP | 2003259076 | A * | 9/2003 |
| JP | 2004-272823 |  | 9/2004 |

OTHER PUBLICATIONS

Microsoft Outlook 2003; Microsoft Corporation, 1995-2003.*
Japanese Office Action mailed Jan. 31, 2006, directed to counterpart JP Application No. 2004-326337.

* cited by examiner

*Primary Examiner*—Kee M Tung
*Assistant Examiner*—Michelle K Lay
(74) *Attorney, Agent, or Firm*—Morrison & Foerster LLP

(57) ABSTRACT

An image processing apparatus, which transmits image data to a plurality of addresses via a network, includes a transmission device which transmits the image data to an address in the plurality of addresses, an address setting device which sets at least one of the plurality of addresses, a determining device which determines, with respect to each of the at least one of the plurality of addresses, whether or not to transmit the image data thereto on the basis of an attribute thereof, and a display device which displays a first address among the plurality of addresses to which the determining device determines to transmit the image data, and a second address among them to which the determining device determines not to transmit the image data on the same screen, in different manners from each other.

8 Claims, 18 Drawing Sheets

IMAGE PROCESSING APPARATUS AND IMAGE PROCESSING METHOD

This application is based on Japanese Patent Application No. 2004-326337 filed in Japan on Nov. 10, 2004, the contents of which are hereby incorporated by reference.

BACKGROUND OF THE INVENTION

1. Field of the Related Art

The present invention relates to an image processing apparatus and an image processing method, and more specifically to the image processing apparatus such as a Multiple Function Peripheral, which can transmit image data to a plurality of addresses, and the image processing method by which the image data can be transmitted to the plurality of addresses.

2. Description of the Related Art

In recent years, an image processing system has been in use, where a Multiple Function Peripheral (hereinafter referred to as "MFP") is connected to a plurality of terminals by a local area network (hereinafter referred to as "LAN") or the like. In such an image processing system, for example, data obtained by scanning a document with a scanner unit of the MFP can be transmitted from the MFP to each terminal.

In transmitting data from the MFP to each terminal, a user sets an address of a person to which the data is to be transmitted with an operation panel. In general, a list of a plurality of names previously registered as an address book is displayed on the operation panel. The user selects at least one name from the list as a name to which the data is to be transmitted. However, the following cases sometimes occur in selecting a specific name from the list as described above. The user might erroneously select a name of a different person similar to the name of a person to which the data is to be transmitted, or the user might erroneously select, by touching with a finger or the like, a name of a different person displayed adjacent to the name of the person to which the data is to be transmitted. If the user does not notice the erroneous selection of the name and then transmits the data to a totally unrelated person, a serious problem, such as leakage of secret information, may arise.

For example, in some conventional fax machines, upon manual input of a phone number of a person to which a message is to be sent, information of the person corresponding to the input phone number is displayed so as to prevent input error of a phone number (e.g. Japanese Patent Laid-Open Publication No. 2001-77997).

Further, in some conventional fax machines, when a plurality of addresses have been set, an operator is informed, prior to transmission of data, that a plurality of addresses have been set by means of a message displayed on a display (e.g. Japanese Patent Laid-Open Publication No. 11-225260.)

Moreover, in some conventional fax machines, it is detected that a user has set broadcasting transmission by inputting a plurality of addresses with an operation means, and on condition of this detection, a screen confirming the setting of the broadcasting transmission is displayed (e.g. Japanese Patent Laid-Open Publication No. 11-146174)

SUMMARY OF THE INVENTION

It is an object of the present invention to provide an image processing apparatus and an image processing method, which make it possible to prevent erroneous transmission of data to a totally unrelated person.

According to a first aspect of the present invention, an image processing apparatus, which transmits image data to a plurality of addresses via a network, includes a transmission device which transmits the image data to an address in the plurality of addresses, an address setting device which sets at least one of the plurality of addresses, a determining device which determines, with respect to each of the at least one of the plurality of addresses, whether or not to transmit the image data thereto on the basis of an attribute thereof, and a display device which displays a first address among the plurality of addresses to which the determining device determines to transmit the image data, and a second address among them to which the determining device determines not to transmit the image data on the same screen, in different manners from each other.

According to a second aspect of the present invention, an image processing method, performed in an image processing apparatus which transmits image data to a plurality of addresses via a network, includes the steps of obtaining at least one of the plurality of addresses, determining, with respect to each of the at least one of the plurality of addresses, whether or not to transmit the image data thereto on the basis of an attribute thereof, and displaying a first address among the plurality of addresses to which the determining device determines to transmit the image data, and a second address among them to which the determining device determines not to transmit the image data on the same screen, in different manners from each other.

An advantage of the image processing apparatus according to the present invention is that it becomes easier to confirm whether or not an address has been set without an error, thereby making it possible to prevent erroneous transmission of the image data to a totally unrelated person.

An advantage of the image processing method according to the present invention is that it becomes easier to confirm whether or not an address has been set without an error, thereby making it possible to prevent erroneous transmission of the image data to a totally unrelated person.

BRIEF DESCRIPTION OF THE DRAWINGS

Additional objects and advantages of the present invention will be apparent from the following detailed description of preferred embodiments thereof, which are best understood with reference to the accompanying drawings.

DETAILED DESCRIPTION OF THE PREFERRED EMBODIMENTS

The following is a detailed description of main embodiments of the invention, with reference to the drawings in which the same numerical references designate the corresponding elements throughout the different drawings.

Embodiment 1

As described above, there are conventional fax machines where setting of a plurality of addresses is displayed, ones where the broadcasting transmission is displayed, and ones where information of a person corresponding to the person's phone number is displayed. However, in conventional fax machines where the setting of a plurality of addresses or the broadcasting transmission is displayed, the user cannot confirm whether the set addresses are correct or not while being able to confirm whether the set addresses are single or plural. As a result, there has been a problem in which the data might be transmitted to an erroneously selected address when such an address is included in a plurality of selected addresses without the user noticing it. Further, in the foregoing fax machines where information of a person corresponding to the person's phone number is displayed, individual addresses can be confirmed, but the user has a bigger burden in confirming each address with the increase of information of people to which the message is to be sent. This decreases accuracy in confirmation of each address. As a result, there has been a problem in which the data might be transmitted to an erroneously selected address without the user noticing it.

An image processing apparatus according to the present invention is made for solving the above problems. The image processing apparatus according to the present invention determines, with respect to each address set by a user, whether or not to transmit image data to the address, on the basis of an attribute of the address. The image processing apparatus then displays the address to which the image data is determined to be transmitted, and the address to which the image data is determined not to be transmitted on the same screen, in different manners from each other. The user can check the displayed addresses and confirm, with particular care, whether an address, to which the image processing apparatus has determined not to transmit the image data, is correct or not. Thus, it is possible to markedly reduce the number of cases that the image data is erroneously transmitted to a totally unrelated person.

An image processing apparatus according to an embodiment 1 stores an attribute of an address preset, for example, by an administrator of the image processing apparatus, and compares an attribute of an address set by a user, namely a transmitter, with the previously stored attribute of the address. When they correspond to each other, the image processing apparatus determines to transmit image data to the address set by the user. When they do not correspond to each other, it determines not to transmit the image data to the address set by the user.

Figure 1:
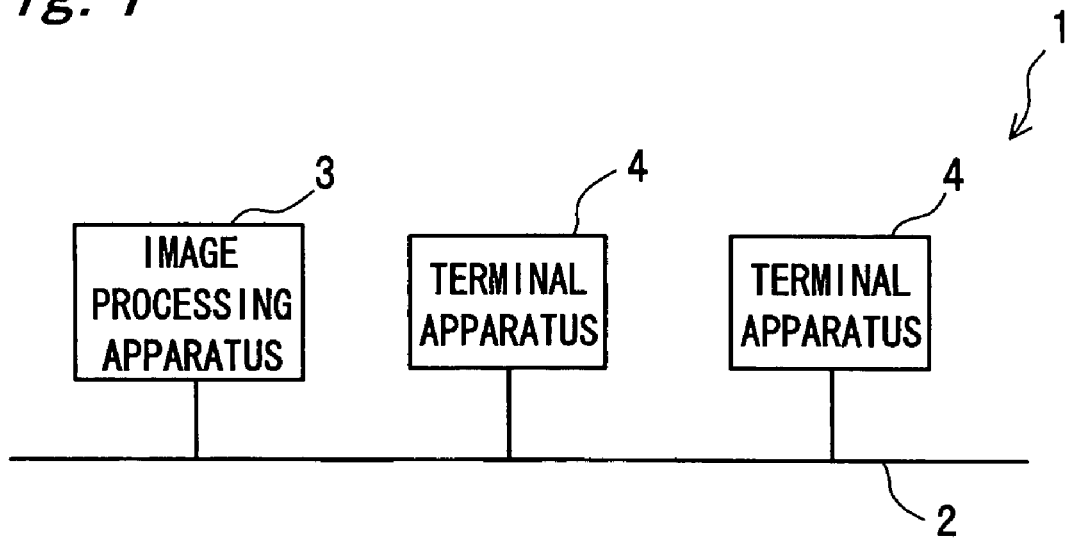
FIG. 1 is a block diagram of a configuration example of an image processing system which has an image processing apparatus according to an embodiment 1 of the present invention.

FIG. 1 shows an example of a block diagram of a configuration of an image processing system, including an image processing apparatus according to the embodiment 1 of the present invention. As shown in FIG. 1, an image processing system 1 has at least one image processing apparatus 3 and at least one terminal 4, connected to each other by a network 2 such as the LAN. It is to be noted that, in the following example, the image processing system is an intra-company image processing system, and the network 2 is the LAN. The image processing apparatus 3 is for example a MFP, and the terminal 4 is for example a personal computer (hereinafter referred to as "PC").

Figure 2:
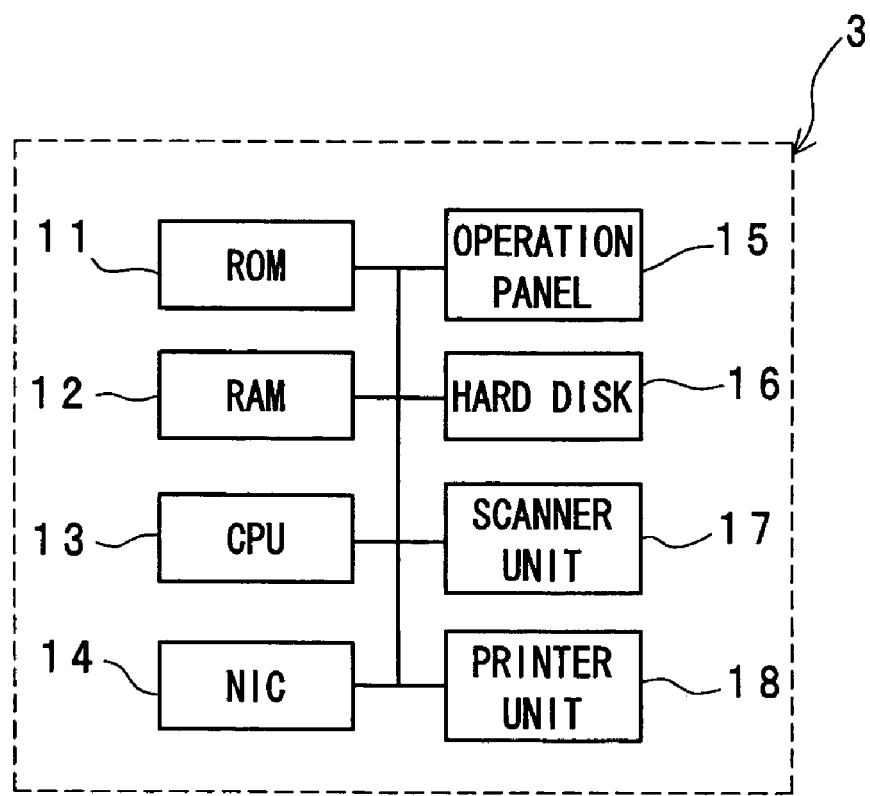
FIG. 2 is a block diagram of a configuration example of an image processing apparatus 3 according to the embodiment 1 of the present invention.

FIG. 2 shows an example of a block diagram of a configuration of the image processing apparatus 3 according to the embodiment 1. As shown in FIG. 2, the image processing apparatus 3 has an ROM 11, an RAM 12, a CPU 13, a network interface card (hereinafter referred to as "NIC") 14, an operation panel 15, a hard disk 16, a scanner unit 17, and a printer unit 18. The NIC 14 is a device used to connect the image processing apparatus 3 to the network 2. The operation panel 15 is a panel with which a user logs in and out, sets an address, and performs other operations. The hard disk 16 stores an address book and various sorts of programs corresponding to each image processing apparatus 3. The CPU 13 controls each component of the image processing apparatus 3 according to the programs respectively stored in the ROM 11 and the hard disk 16.

Figure 3:
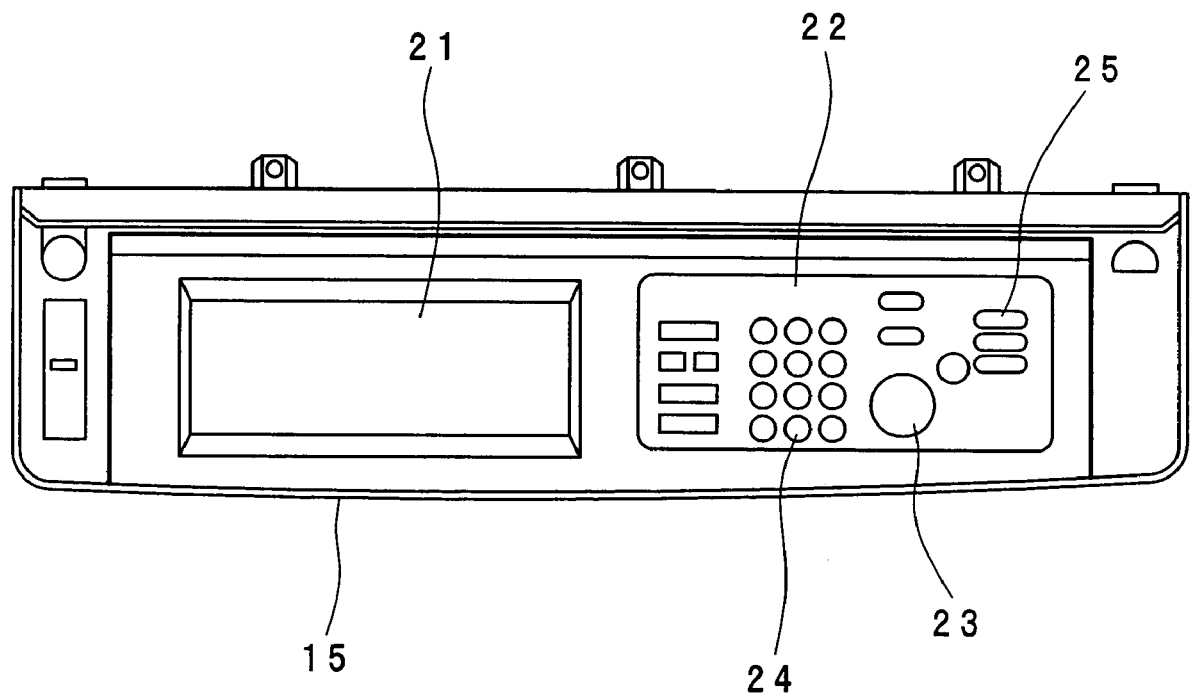
FIG. 3 is a plan view of an operation panel 15 of the image processing apparatus 3 according to embodiment 1 of the present invention.

FIG. 3 is a plan view of the operation panel 15. As shown in FIG. 3, the operation panel 15 has a basic screen operation part 21 and a button operation part 22. The basic screen operation part 21 is a display screen. By touching this screen, the user can operate the image processing apparatus 3. The button operation part 22 has a start button 23, a ten-key button 24 and a plurality of mode buttons 25. Each of the mode buttons 25 corresponds to a copy mode, a scanner mode, and a printer mode. The user can press any of the mode buttons 25 to switch the function of the image processing apparatus 3 to the function corresponding to the button pressed, namely copying, scanning or printing.

Figure 4:
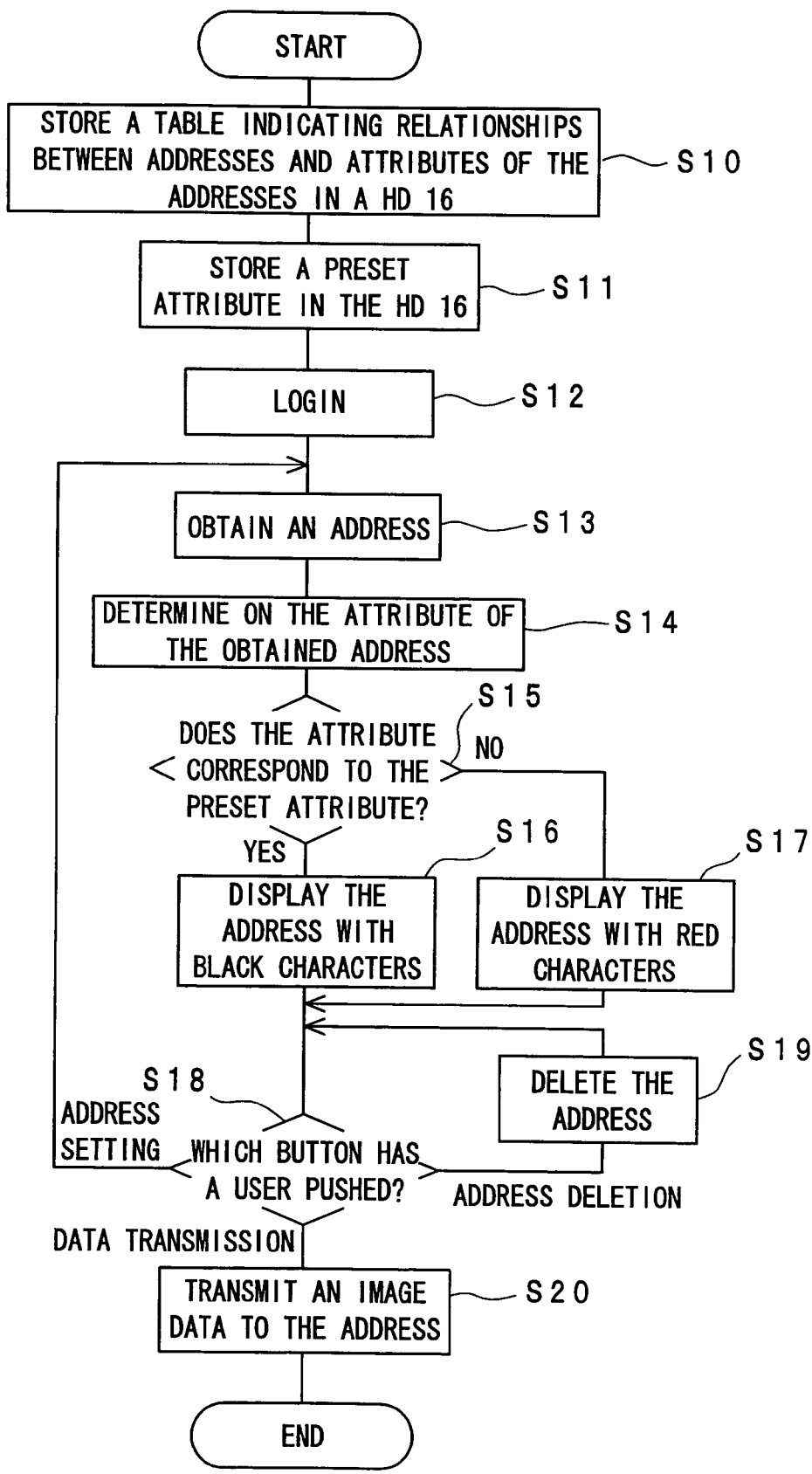
FIG. 4 is a flowchart of a control flow of a CPU 13 of the image processing apparatus according to embodiment 1 in the case where a user has set an address.

In the following, the operation of the image processing apparatus 3 is described in the case where the image data is transmitted to an address set with the operation panel 15 via the network 2. FIG. 4 is a flowchart showing a control flow of the CPU 13 in the case where an address with the attribute other than a previously stored attribute is displayed with a different color from the address with the previously stored attribute when the address with the attribute other than a previously stored attribute is set by user. First, an administrator of the image processing apparatus 3 or some others, for example, presets an address book, a table indicating relationships between addresses registered in the address book and attributes of the addresses, and one attribute of an address in the image processing apparatus 3. Specifically, as shown in FIG. 4, first, the CPU 13 drives the hard disk (described as "HD" in FIG. 4) 16 to previously store an address book and a table indicating relationships between addresses registered in the address book and attributes of the addresses (step S10). When the administrator of the image processing apparatus 3 or some others sets an attribute of an address with the operation panel 15, the CPU 13 drives the hard disk 16 to previously store the set attribute (that is, the preset attribute) of the address (step S11). Subsequently, when a user presses a login button on the operation panel 15 and inputs a password and the like (step S12), the CPU 13 drives the operation panel 15 to display an initialization screen. The user then presses a predetermined address setting button on the initialization screen or on a predetermined address setting screen displayed by switching the initialization screen at least once. Upon pressing the predetermined address setting button by the user, the CPU 13 reads the address book stored in the hard disk 16, and the address book is displayed on the operation panel 15. The user selects an address from the screen of the address book to set the address.

Figure 5:
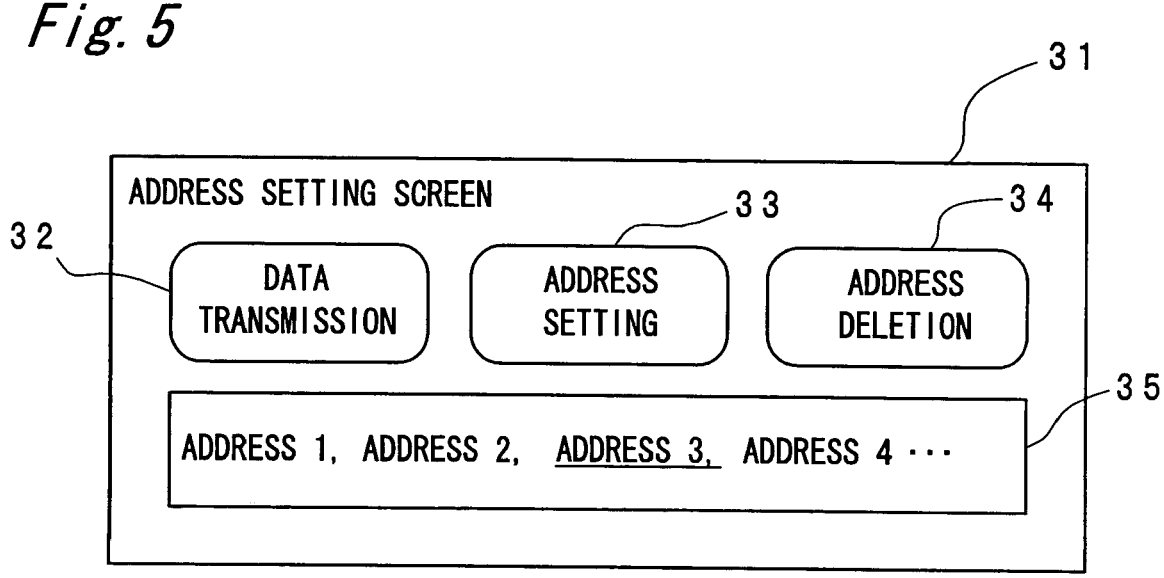
FIG. 5 is a diagram of one example of an address setting screen displayed on the operation panel 15.
Figure 6:
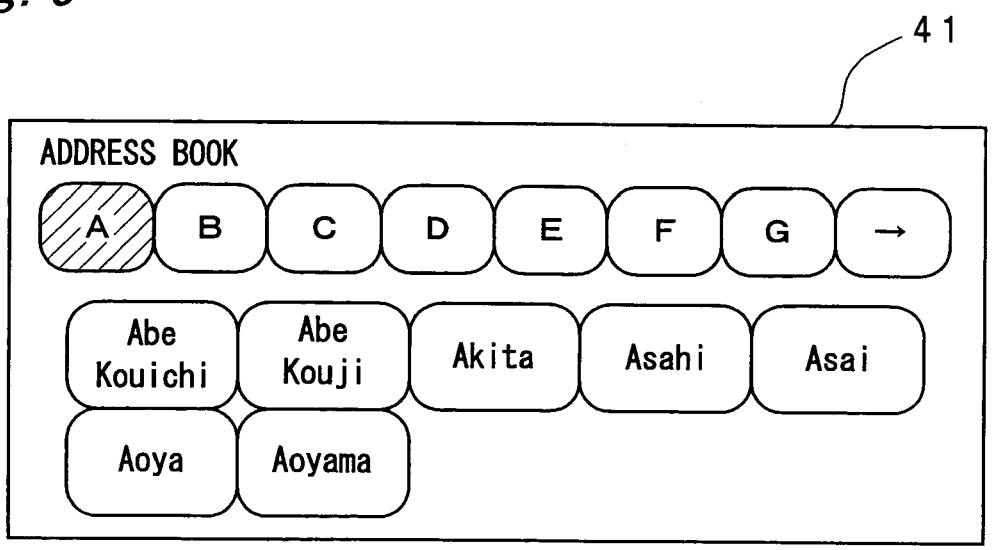
FIG. 6 is a diagram of one example of a screen of an address book displayed on the operation panel 15.

FIG. 5 shows one example of the above-mentioned address setting screen. FIG. 6 shows one example of the above-mentioned screen of an address book. As shown in FIG. 5, the address setting screen 31 has a data transmission button 32, an address setting button 33, an address deletion button 34, and an already-set address displaying part 35. The user uses this address setting screen 31 to perform operations of setting of an address, deletion of an address, and issuing of a data transmission command. When the user presses the address setting button 33, the screen on the operation panel 15 is switched to a screen 41 of an address book as shown in FIG. 6. When the screen 41 of the address book is displayed, the user can select an address from the displayed address book to set the address. When the user has selected one address on the screen 41 of the address book, the screen on the operation panel 15 is shifted back to the address setting screen 31, where the selected address is displayed in the already-set address displaying part 35. Then, in setting an additional address, the user presses the address setting button 33. It is to be noted that, although the address is set by selection from the address book in the image processing apparatus 3 according to this embodiment, this does not limit the method for setting the address.

In FIG. 4, every time the CPU 13 obtains one address from the operation panel 15 (step S13), it determines on the attribute of the obtained address by reference to the table stored in the hard disk 16 (step S14). The CPU 13 further reads the attribute of the address previously stored in the hard disk 16, to compare the attribute of the address obtained in the step S14 with the attribute of the address previously stored in the hard disk 16 (step S15). When those attributes correspond to each other, the CPU 13 determines to transmit the image data to the address set by the user (YES in the step S15), and drives the operation panel 15 to display the address set by the user (that is, the obtained address) with characters of an unchanged color, namely black characters, in the already-set address display part 35 (FIG. 4) (step S16). On the other hand, when those attributes do not correspond to each other, the CPU 13 determines not to transmit the image data to the address set by the user (NO in the step S15), and drives the operation panel 15 to display the address set by the user with characters of a changed color, such as red, in the already-set address display part 35 (step S17). Such a display can inform the user that the attribute of the address set by the user differs from the attribute previously limited (that is, preset) by the administrator of the image processing apparatus 3, for example.

The user checks the addresses displayed in the already-set address display part 35 to reconfirm whether each of the addresses is correct as an address to which the image data is transmitted. Herein, the address displayed with red characters, the attribute of which is different from the attribute previously limited by the administrator, can be confirmed with particular care. After the confirmation, the user presses any of the three buttons 32 to 34 displayed on the address setting screen 31. Upon pressing any of the buttons 32 to 34, a control signal is produced according to the kind of the button pressed by the user, out of the buttons 32 to 34. The CPU 13 detects which button was pressed by the user, according to the control signal thus produced (step S18). When the user presses the address setting button 33 ("address setting" in the step 518), the CPU 13 drives the operation panel 15 to display the screen 41 of the address book again. Further, when the user presses the address deletion button 34 ("address deletion" in the step S18), the CPU 13 drives the operation panel 15 to delete the address set immediately before pressing the button 34, that is, the address lastly displayed (step S19). Further, when the user presses the data transmission button 32 ("data transmission" in the step S18), the image data is transmitted by the NIC 14 to all the addresses displayed in the already-set address display part 35 (step S20), to complete the processing.

It is for example assumed that the attribute of the address preset by the administrator of the image processing apparatus 3 is "intra-company". In this case, when the user sets an address 1 and an address 2, having the attribute "in-company", those addresses are displayed with black characters in the already-set address display part 35, as shown in FIG. 5. When the user sets an address 3, having the attribute "extra-company", the address 3 is displayed with red characters (underlined characters in FIG. 5) in the already-set address display part 35. Such a display can inform the user of the setting of the "extra-company" address. Thus, the user can readily find that the addresses having different attributes have been set. Accordingly, when the address has erroneously been set, the user can readily find the error and correct the erroneously set address before transmitting the data. It is to be noted that the combination of colors for use in displaying addresses need not necessarily be black and red. Other combinations are obviously possible so long as an address having an attribute corresponding to the preset attribute can be differentiated from an address having an attribute not corresponding to the preset attribute. Further, those addresses may be differentiated by means of sizes or styles of displayed characters in place of the colors thereof.

It is to be noted that, as described above, the image processing apparatus determines whether to transmit the image data to addresses or not, for the purpose of determining how those addresses are displayed on a screen, and not for the purpose of determining whether to actually transmit the image data to those addresses or not. Whether the image data is to be actually transmitted to those addresses or not is determined according to whether the user presses the "data transmission button 32" or not. Therefore, even when the image processing apparatus determines not to transmit the image data to a certain address, if the user does not delete that address and presses the data transmission button 32 with the address displayed in the already-set address display part 35, then the image data is transmitted to the address. On the contrary, even when the image processing apparatus determines to transmit the image data to another certain address, if the user deletes that address, then the image data is not transmitted to the address.

Figure 7:
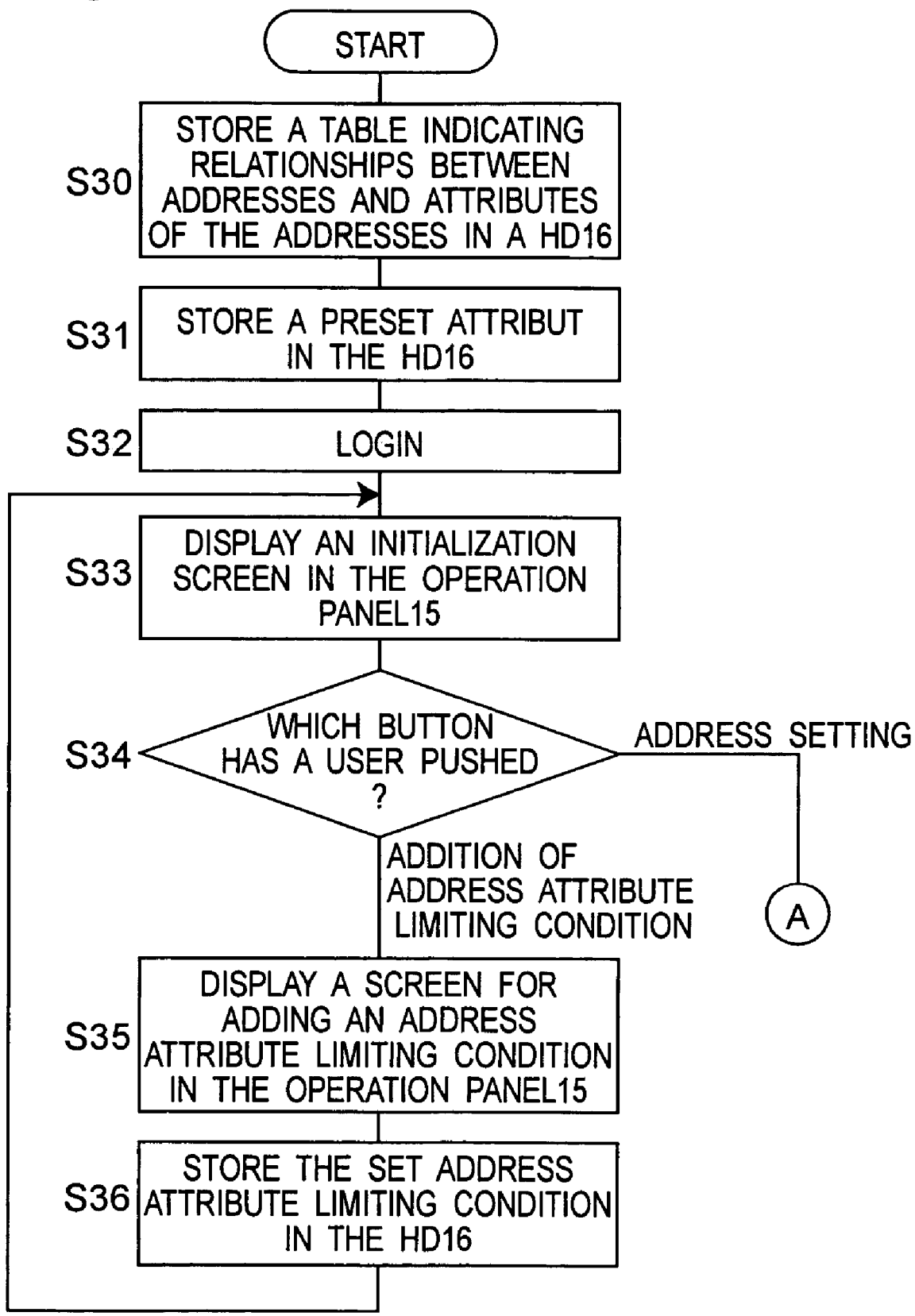
FIG. 7 is part of a flowchart of a control flow of the CPU 13 in the case where the user adds another attribute to a previously limited attribute.
Figure 8:
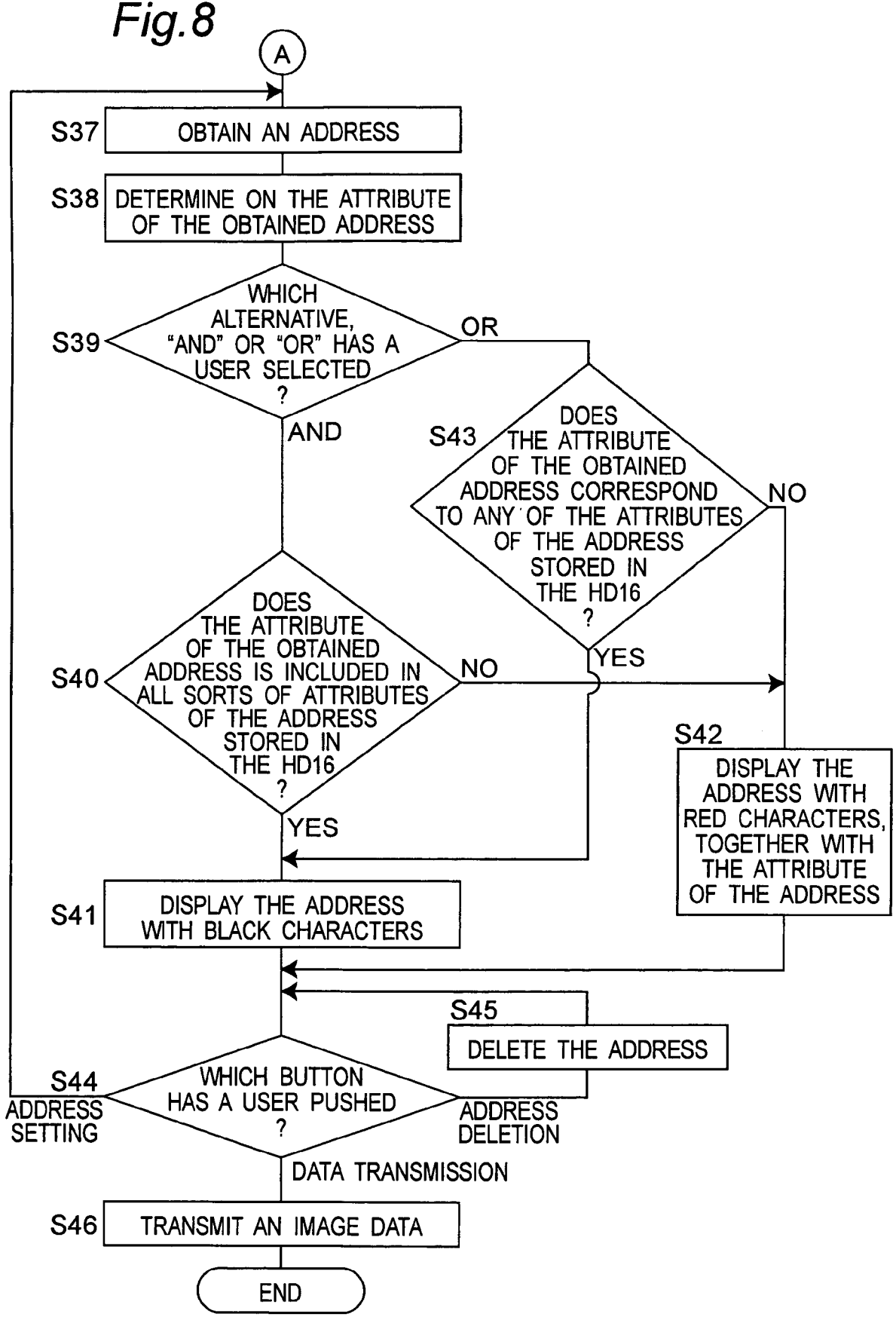
FIG. 8 is part of a flowchart of a control flow of the CPU 13 in the case where the user adds another attribute to a previously limited attribute.

It is to be noted that the user can add a new attribute of an address to the attribute of the address, preset by the administrator of the image processing apparatus 3 or some others. FIG. 7 as well as FIG. 8 is a flowchart showing a control flow of the CPU 13 in the case where the user adds a new attribute to the previously limited attribute. As shown in FIG. 7, first, the CPU 13 drives the hard disk (described as "HD" in FIG. 7) 16 to previously store an address book and a table indicating relationships between addresses registered in the address book and attributes of the addresses (step S30). When the administrator of the image processing apparatus 3 or some others sets an attribute of an address with the operation panel 15, the CPU 13 drives the hard disk 16 to previously store the set attribute of the address (step S31). Subsequently, when the user presses a login button on the operation panel 15 and inputs a password and the like (step S32), the CPU 13 drives the operation panel 15 to display an initialization screen (step S33).

Figure 9:
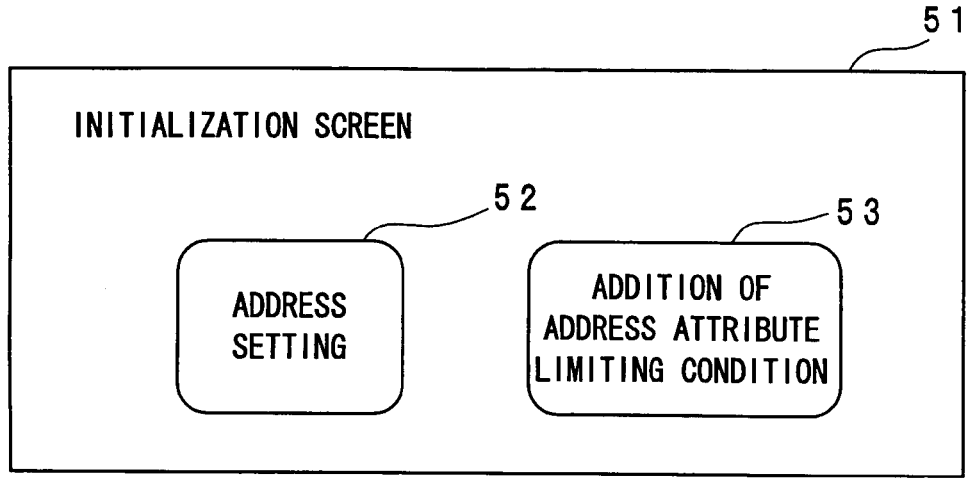
FIG. 9 is a diagram of one example of an initialization screen displayed on the operation panel 15.

FIG. 9 shows one example of the initialization screen displayed in the step S33 in FIG. 7. As shown in FIG. 9, the initialization screen 51 has an address setting button 52 and a button 53 for adding an address attribute limiting condition. When an attribute of an address, which is stored in the hard disk 16 and to be compared with the attribute of the address set by the user, namely the address attribute limiting condition, may be the condition preset by the administrator of the image processing apparatus 3 or some others, the user presses the address setting button 52 to perform an address setting. On the other hand, when a new condition is required to be added to the preset address attribute limiting condition, the user presses the button 53 for adding an address attribute limiting condition, to perform an additional setting of an address attribute limiting condition.

As shown in FIG. 7, when the user presses the button 53 for adding an address attribute limiting condition on the initialization screen 51 ("addition of address attribute limiting condition" in the step S34), the CPU 13 drives the operation panel 15 to display a screen for adding an address attribute limiting condition (step S35). The user adds an address attribute limiting condition by using the screen for adding an address attribute limiting condition. In the following, the process for adding an address attribute limitation condition is described.

Figure 10:
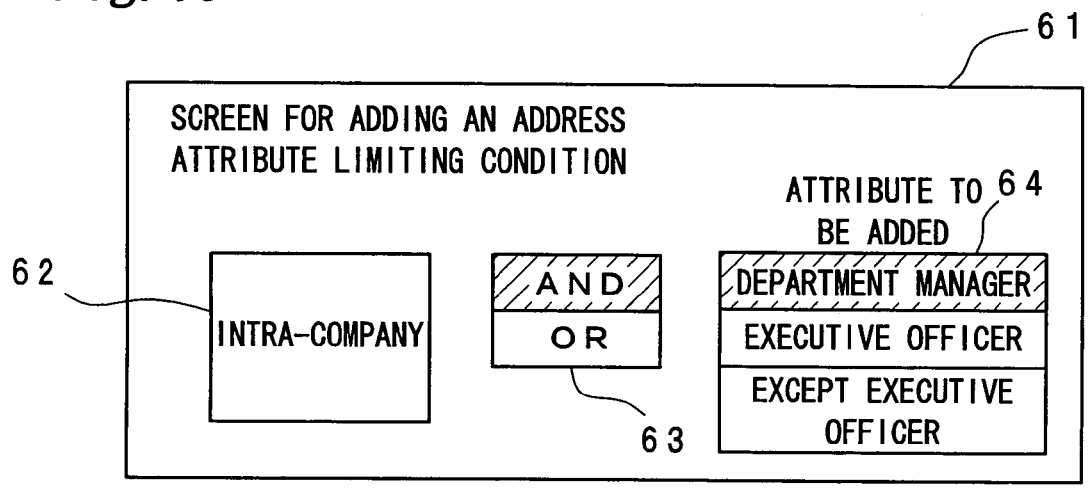
FIG. 10 is a diagram of one example of a screen for adding an address attribute limiting condition displayed on the operation panel 15.

FIG. 10 shows one example of the above-mentioned screen for adding an address attribute limiting condition. As shown in FIG. 10, on a screen 61 for adding an address attribute limiting condition, a default condition preset by the administrator of the image processing apparatus 3, namely a condition 62 which cannot be changed by the user, alternatives 63 of "AND" or "OR", and a list 64 of address attribute limiting conditions that can be added to the preset condition are displayed. In adding an address attribute limiting condition, the user selects "AND" or "OR" from the alternatives 63, and selects an address attribute limiting condition to be added from the list 64. In the example shown in FIG. 10, "intra-company" has been set as the attribute of the default condition, and "department manager" has been set by the user as the additional attribute. In this case, it is determined that the image data is transmitted to the address set by the user, only when the address has the attribute of "intra-company department manager". When the user adds one condition on this screen 61, the CPU 13 drives the operation panel 15 to display the initialization screen 51 again. When further adding a condition, the user presses the button 53 for adding an address attribute limiting condition. When not adding, the user presses the address setting button 52. When the user adds the address attribute limiting condition, the CPU 13 drives the hard disk 16 to store the set address attribute limiting condition. (step S36).

When the user presses the address setting button 52 on the initialization screen 51 ("address setting" in the step S34), the CPU 13 drives the operation panel 15 to display the address setting screen 31. The subsequent processes are the same as described above referring to FIG. 4. When the user presses the address setting button 33, the CPU 13 drives the operation panel 15 to shift the screen to the screen 41 of the address book as shown in FIG. 6. When the screen 41 of the address book is displayed, the user can select an address from the displayed address book to set the address. When the user selects one address on the screen 41 of the address book, the CPU 13 drives the operation panel 15 to shift the screen back to the address setting screen 31, and to display the selected address is displayed in the already-set address displaying part 35. In setting an additional address, the user presses the address setting button 33.

In FIG. 8, every time the CPU 13 obtains one address from the operation panel 15 (step S37), it determines on the attribute of the obtained address by reference to the table stored in the hard disk 16 (step S38). The CPU 13 determines which alternative, "AND" or "OR", has been selected by the user in the alternatives 63 on the screen 61 (step S39) by the address attribute limiting condition stored in the hard disk 16. When determining that the user has selected "AND" ("AND" in the step S39), the CPU 13 reads the attribute of the address stored in the hard disk 16, to compare the attribute of the address obtained in the step S38 with the attribute of the address stored in the hard disk 16 (step S40). Herein, the attributes of the address stored in the hard disk 16 refers to the attribute previously stored in the hard disk 16, and the attribute of the address added by the user to the hard disk 16 after login. When the attribute of the obtained address is included in all sorts of attributes of the address stored in the hard disk 16, the CPU 13 determines to transmit the image data to the address set by the user (YES in the step S40), and drives the operation panel 15 to display the address set by the user with characters of unchanged color, namely black characters, in the already-set address display part 35 (step S41). On the other hand, when the attribute of the obtained address is not included in at least one sort of attributes of the address stored in the hard disk 16, the CPU 13 determines not to transmit the image data to the address set by the user (NO in the step S40), and drives the operation panel 15 to display the address set by the user with characters of a changed color such as red, together with the attribute of the address, in the already-set address display part 35 (step 42).

On the other hand, in determining which alternative, "AND" or "OR", has been selected in the alternatives 63 on the condition adding screen 61 (step S39), when the CPU 13 determines that the user has selected "OR" ("OR" in the step S39), it reads the attributes of the address stored in the hard disk 16, to compare the attribute of the address obtained in the step S38 with the attributes of the address stored in the hard disk 16 (step S43). Herein, the attributes of the address stored in the hard disk 16 refers to the attribute previously stored in the hard disk 16, and the attribute of the address added by the user to the hard disk 16 after login. When the attribute of the set address corresponds to either the previously stored attribute or the attribute of the address added by the user after login, both of the attributes being stored in the hard disk 16, the CPU 13 determines to transmit the image data to the address set by the user (YES in the step S43), and drives the operation panel 15 to display the address set by the user with an characters of unchanged color, namely black characters, in the already-set address display part 35 (step S41). On the other hand, when the attribute of the set address corresponds to neither the previously stored attribute nor the attribute of the address added by the user after login, both of the attributes being stored in the hard disk 16, the CPU 13 determines not to transmit the image data to the address set by the user (NO in the step S43), and drives the operation panel 15 to display the address set by the user with characters of a changed color such as red, together with the attribute of the address, in the already-set address display part 35 (step 42). Such a display can inform the user that the attribute of the set address differs from the address attribute limiting condition. The subsequent process steps S44 to S46 are equivalent to the steps S18 to S20 shown in FIG. 4, and hence descriptions of the steps S44 to S46 are omitted.

Figure 11:
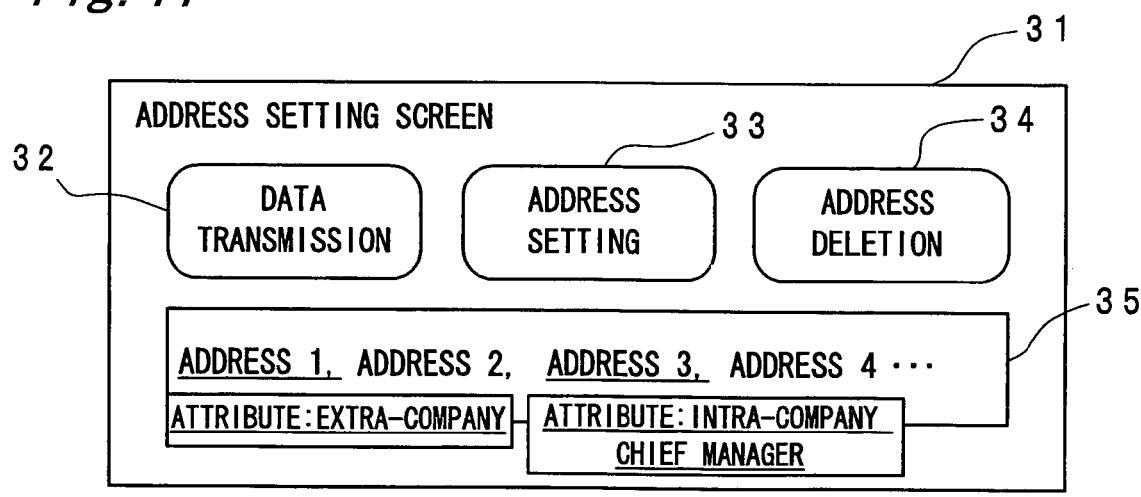
FIG. 11 is a diagram showing one example of an address setting screen 31 in the case where all addresses set by the user are displayed on an already-set address display part 35.

FIG. 11 is a diagram showing the address setting screen 31 in the case where all addresses, set by the user in the steps S41 and S42, are displayed in the already-set address display part 35. In the address setting screen 31 shown in FIG. 11, an address to which the image processing apparatus 3 has determined to transmit the image data and an address to which the image processing apparatus 3 has determined not to transmit the image data are displayed in different manners from each other, and besides, the attribute of the latter address is displayed. For example, in the case where the preset address attribute limiting condition is "intra-company" and the user selects "AND" from the alternatives 63, and "department manager" from the list 64, namely the user adds "intra-company department manager" as a new address attribute limiting condition, when the user sets an address 1, having the attribute "intra-company", the address 1 is displayed with red characters and the attribute of the address 1 is also displayed in the already-set address display part 35. Further, when the user sets an address 2, having the attribute "intra-company department manager", the address 2 is displayed with black characters in the already-set address display part 35. Moreover, when the user sets an address 3, having an attribute "intra-company chief manager", the address 3 is displayed with red characters and the attribute of the address 3 is also displayed in the already-set address display part 35. Such a display can readily inform the user that the addresses, having a different attribute from the previously limited attribute "intra-company department manager", have been set. By looking at the display, the user can be informed of the above setting, thereby to delete those addresses having a different attribute from the "intra-company department manager" before transmitting the data, so that an address setting error can be prevented.

Figure 12:
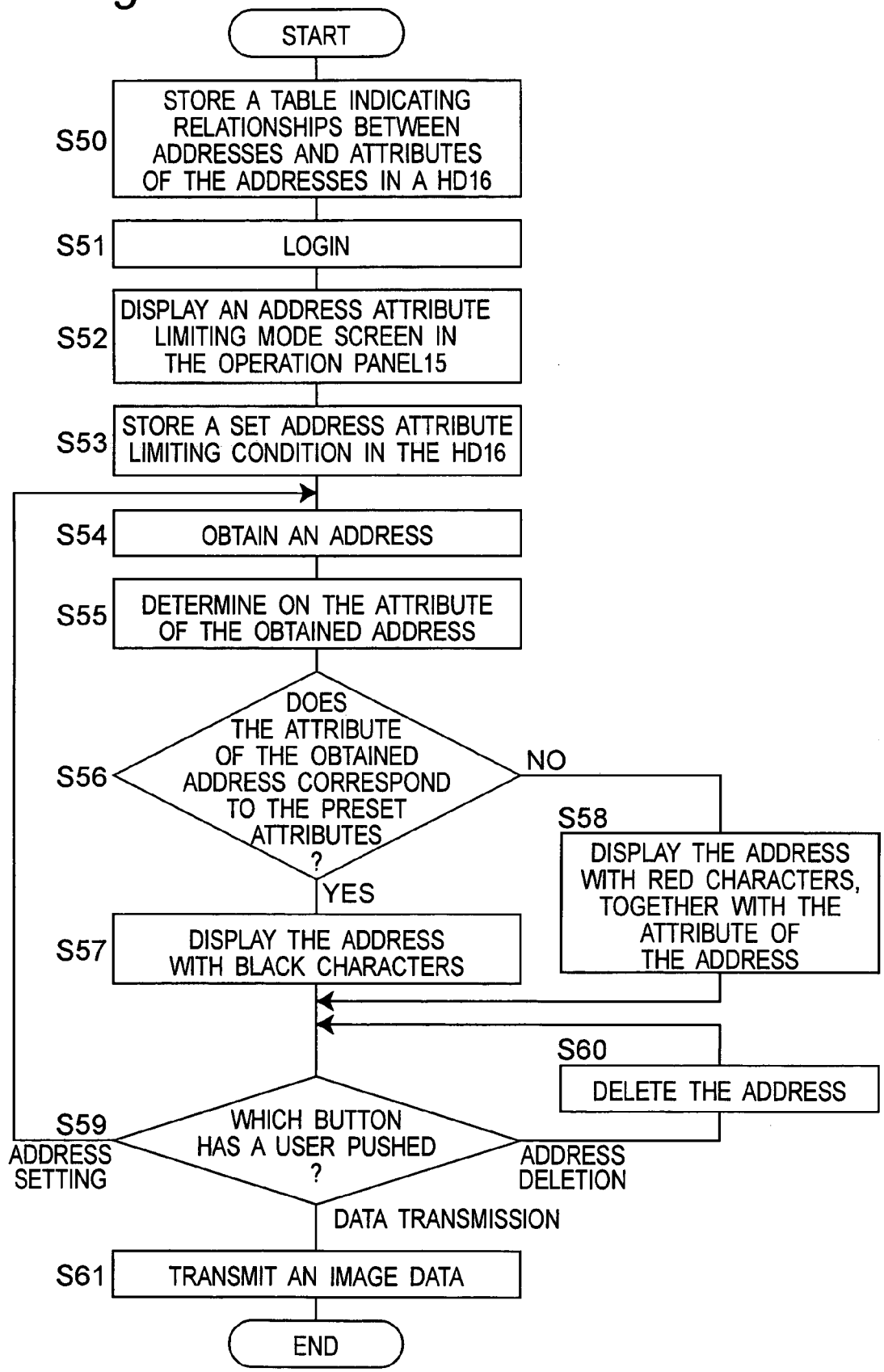
FIG. 12 is a flowchart of a control flow of the CUP 13 in the case where the user sets an attribute of an address after login.

Further, an attribute of an address can be set by the user after login, instead of being preset by the administer of the image processing apparatus 3 or some others. FIG. 12 is a flowchart showing a control flow of the CUP 13 in the case where the user initially sets an attribute of an address after login. In this case, it is not necessary for the administrator of the image processing apparatus 3 to previously limit the attribute of the address. The administrator of the image processing apparatus 3 or some others sets an address book and a table indicating relationships between addresses registered in the address book and attributes of the addresses in the image processing apparatus 3. As shown in FIG. 12, the CPU 13 drives the hard disk (described as "HD" in FIG. 4) 16 to previously store an address book and a table indicating relationships between addresses registered in the address book and attributes of the addresses (step S50). When the user presses a login button on the operation panel 15 and inputs a password and the like (step S51), the CPU 13 drives the operation panel 15 to display an address attribute limiting mode screen (step S52).

Figure 13:
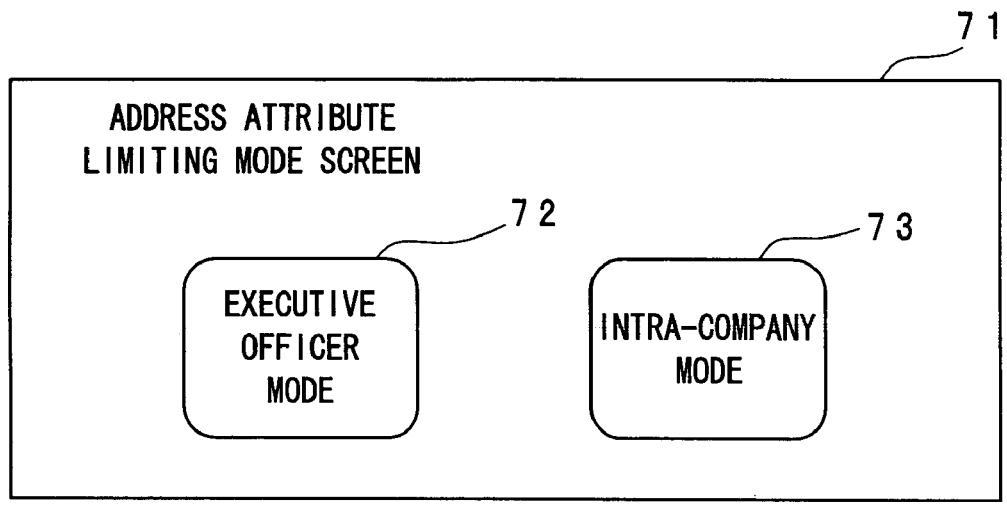
FIG. 13 is a diagram of one example of an address attribute limiting mode screen, displayed on the operation panel 15.

FIG. 13 shows one example of the above-mentioned address attribute limiting mode screen. As shown in FIG. 13, the address attribute limiting mode screen 71 has an executive officer mode button 72 and an intra-company mode button 73. The user can press either of those mode buttons 72 and 73 to set the attribute of the address. For example, when the executive officer mode button 72 is pressed, the attribute of the address to which the image processing apparatus determines to transmit an image data is limited to "executive officer". It is to be noted that this address attribute limiting mode screen 71 is just one example. The number of displayed mode buttons and the sorts of attributes of the address to be set by using each mode button are not limited by this example.

As shown in FIG. 12, when the user presses any address attribute limiting mode button, the CPU 13 drives the hard disk 16 to store the set address attribute limiting condition (step S53). The CPU 13 then drives the operation panel 15 to display the address setting screen 31. The subsequent processes are the same as those described above by reference to FIG. 4. When the user presses the address setting button 33, the screen on the operation panel 15 is switched to the screen 41 of the address book, as shown in FIG. 6. With the screen 41 of the address book displayed, the user can select an address from the displayed address book, to set the address. When the user selects one address on the screen 41 of the address book, the screen on the operation panel 15 is shifted back to the address setting screen 31, where the selected address is displayed in the already-set address displaying part 35. For setting an additional address, the user presses the address setting button 33.

In FIG. 12, every time the CPU 13 obtains one address from the operation panel 15 (step S54), it determines on the attribute of the obtained address by reference to the table stored in the hard disk 16 (step S55). Further, the CPU 13 reads the attribute of the address stored in the hard disk 16, namely the address attribute limiting condition preset by the user in the hard disk 16, to compare the attribute of the address obtained in the step S55 with the attribute of the address stored in the hard disk 16 (step S56). When those attributes correspond to each other, the CPU 13 determines to transmit the image data to the address set by the user, namely the address obtained in the step S54 (YES in the step S56), and drives the operation panel 15 to display the address obtained in the step S54 with characters of an unchanged color, namely black characters, in the already-set address display part 35 (step S57). On, the other hand, when those attributes do not correspond to each other, the CPU 13 determines not to transmit the image data to the address obtained in the step S54 (NO in the step S56), and drives the operation panel 15 to display the address obtained in the step S54 with characters of a changed color such as red, together with the attribute of the address, in the already-set address display part 35 (step 58). Such a display can inform the user that the attribute of the set address differs from the attribute preset by the user. The subsequent process steps S59 to S61 are equivalent to the steps S18 to S20 shown in FIG. 4, and hence descriptions of the steps S59 to S61 are omitted.

Figure 14:
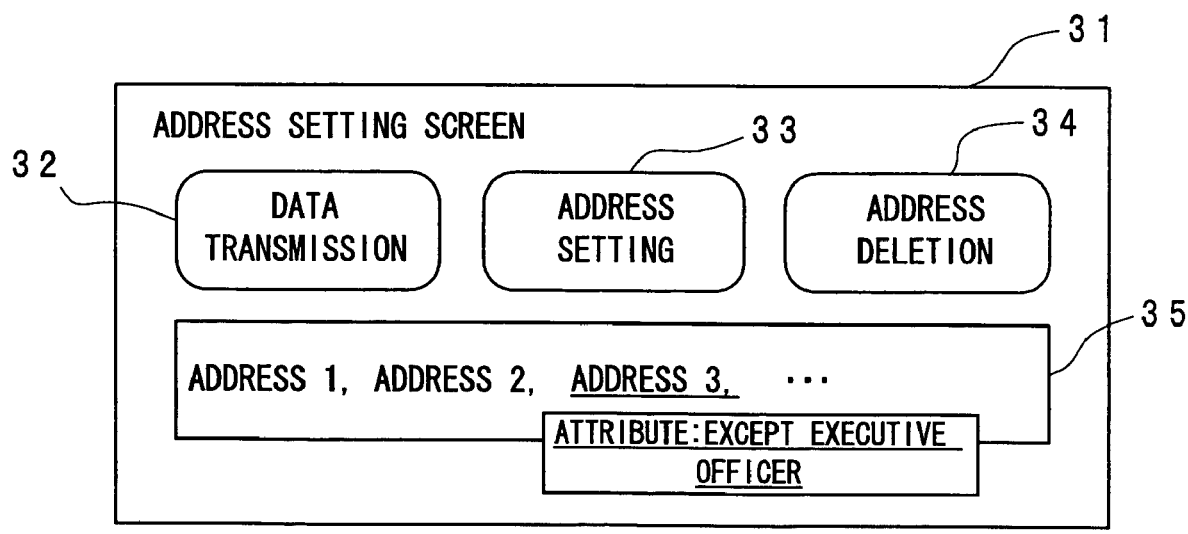
FIG. 14 is a diagram of another example of the address setting screen 31 in the case where all addresses set by the user are displayed in the already-set address display part 35.

FIG. 14 is a diagram showing the address setting screen 31 in the case where all addresses, set by the user in the steps S57 and S58, are displayed in the already-set address display part 35. In the case where the executive officer mode button is pressed on the address attribute limiting mode screen 71 shown in FIG. 12 to limit the attribute of the address to "executive officer", when the user sets an address 1 and an address 2, having the attribute "executive officer" as addresses to which the image data is to be transmitted, those addresses 1 and 2 are both displayed with black characters in the already-set address display part 35. Moreover, when the user sets an address 3, having an attribute "except executive officer", as an address to which the image data is to be transmitted, the address 3 is displayed with red characters (underlined characters in FIG. 13) in the already-set address display part 35, and the attribute of the address 3 is also displayed. Such a display can readily inform the user that the address, having a different attribute from the previously limited attribute "executive officer", has been set. By looking at the display, the user can be informed of the above setting, thereby to delete the address having a different attribute from the "executive officer" before transmitting the data, so that an address setting error can be prevented.

Embodiment 2

An image processing apparatus according to an embodiment 2 of the present invention is described. The configurations of the image processing apparatus and an image processing system employing the image processing apparatus according to the embodiment 2 are similar to those of the image processing apparatus and the image processing system employing the image processing apparatus according to the embodiment 1. Therefore, descriptions of the configurations of the image processing apparatus and the image processing system according to the embodiment 2 are omitted. The image processing apparatus of the embodiment 2 differs from that of the embodiment 1 in that a plurality of attributes of the addresses are preset by the administrator of the image processing apparatus 3 or some others, and when attributes of addresses set by the user corresponds to any of those preset attributes, the addresses set by the user are displayed in different manners depending on the attributes thereof (that is, depending on the preset attributes).

Figure 15:
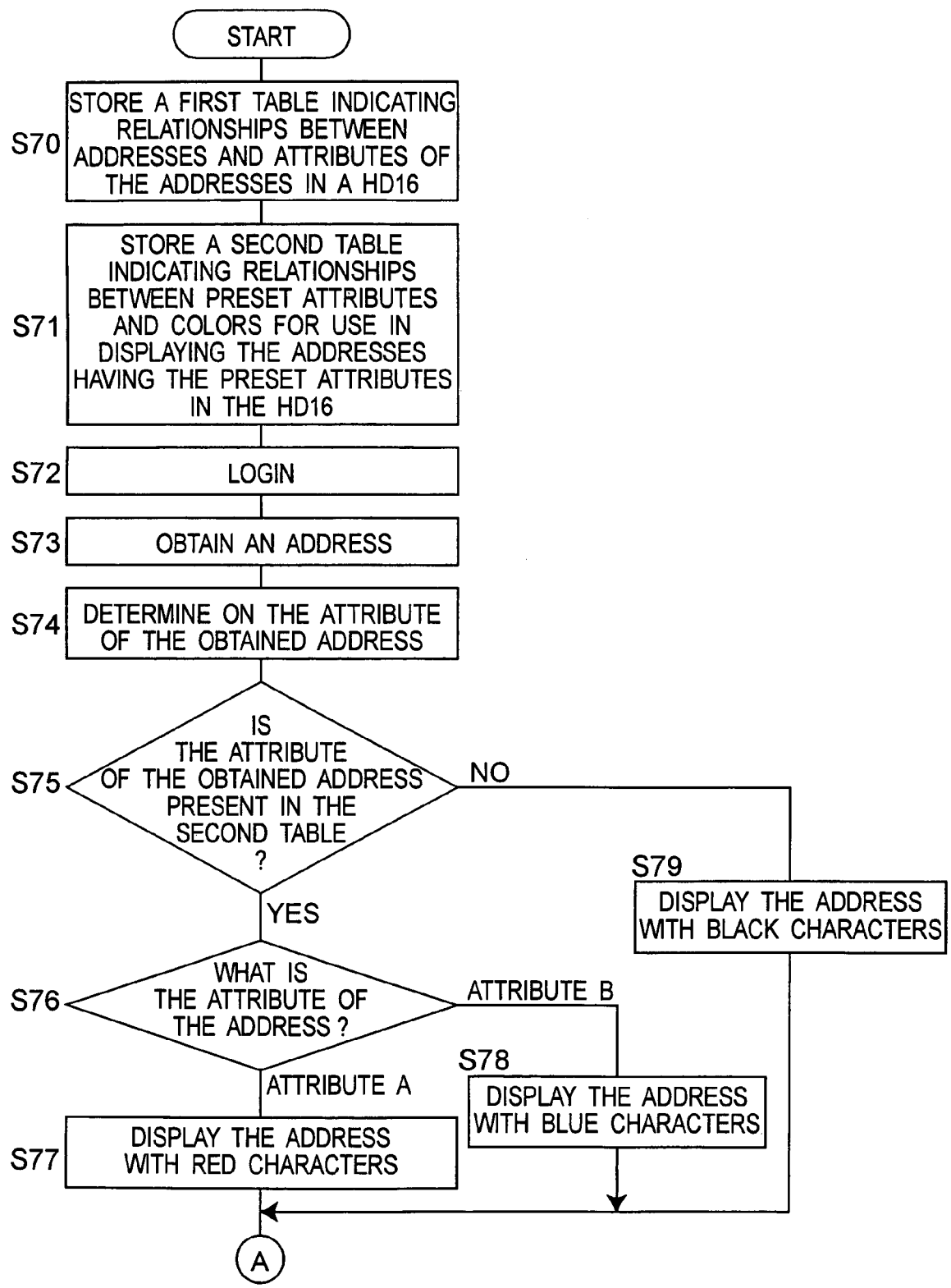
FIG. 15 is part of a flowchart of a control flow of the CPU 13 of an image processing apparatus according to an embodiment 2 in the case where the user has set an address.
Figure 16:
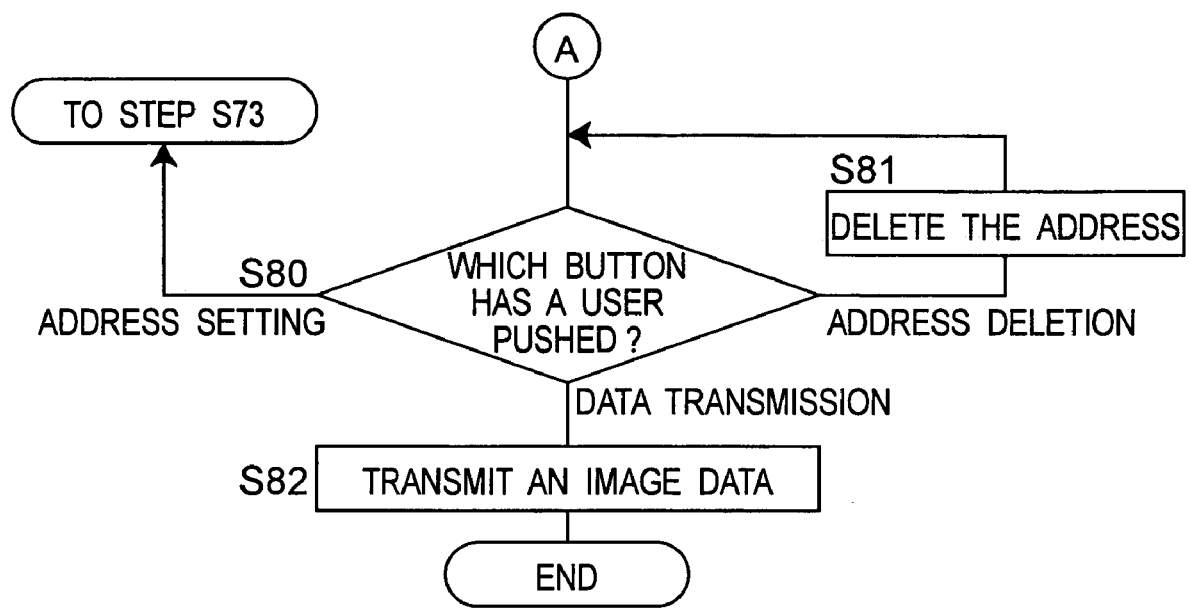
FIG. 16 is part of a flowchart of a control flow of the CPU 13 of the image processing apparatus according to the embodiment 2 in the case where the user has set an address.

FIG. 15 as well as FIG. 16 shows a flowchart showing a control flow of the CPU 13 in the case where, each of addresses set by a user corresponds to any of a plurality of preset addresses, and the addresses set by the user are displayed with different colors depending on the attributes thereof. First, the administrator of the image processing apparatus 3 or some others presets a first table indicating relationships between addresses registered in the address book and attributes of the addresses, and a second table indicating relationships between attributes of addresses and colors for use in displaying the addresses having those attributes, in the image processing apparatus 3. Specifically, as shown in FIG. 15, the CPU 13 drives the hard disk (described as "HD" in FIG. 15) 16 to store the first table indicating relationships between addresses registered in the address book and attributes of the addresses (step S70). Further, when the administrator of the image processing apparatus 3 or some others sets attributes of addresses and colors for displaying the addresses having those attributes on the operation panel 15, the CPU 13 drives the hard disk 16 to store the attributes of the set addresses and the colors corresponding to the attributes, as the second table indicating relationships between attributes of addresses and colors for use in displaying the addresses having those attributes (step 71). When the user presses a login button on the operation panel 15 and inputs a password and the like (step S72), the CPU 13 drives the operation panel 15 to display an initialization screen. The user then sets an address by selection from the address book or some other methods.

In the same manner as in the step S13 of FIG. 4, when the CPU 13 obtains one address (step S73), it determines on the attribute of the obtained address by reference to the first table stored in the hard disk 16 (step S74). The CPU 13 further searches the attribute of the address set by the user, from the second table previously stored in the hard disk 16, which indicates attributes of addresses and colors corresponding to the attributes (step S75). When determining that the attribute of the address set by the user is present in the second table, (YES in the step S75), the CPU 13 searches a color corresponding to the address set by the user, using the second table (step S76). It is for example assumed that, in the second table, red is set for an attribute "A" while blue is set for an attribute "B". When determining the attribute of the address set by the user as the attribute "A" ("attribute A" in the step S76), the CPU 13 drives the operation panel 15 to display the address set by the user with red characters in the already-set address display part 35 (step S77). Similarly, when determining the attribute of the address set by the user as the attribute "B" ("attribute B" in the step S76), the CPU 13 drives the operation panel 15 to display the address set by the user with blue characters in the already-set address display part 35 (step S78). On the other hand, when determining that the attribute of the address set by the user is not present in the second table (No in the step S75), namely determining the attribute of the address set by the user as neither the attribute A nor the attribute B, the CPU 13 drives the operation panel 15 to display set address set by the user with black characters in the already-set address display part 35 (step S79).

The user checks the addresses displayed in the already-set address display part 35 to reconfirm whether each of the addresses is correct. Since the address to which the image processing apparatus 3 has determined not to transmit the image data is displayed with black characters, the user can check this address displayed with black characters with particular care. Further, since even the addresses, displayed with characters of colors other than black, to which the image processing apparatus 3 has determined to transmit the image data, are displayed with the characters of different colors depending on the attributes thereof, the user can still confirm readily whether those addresses are correct or not.

After the confirmation of the addresses, the user presses any of the three buttons 32 to 34 displayed on the address setting screen 31. As shown in FIG. 16, when the user presses the address setting button 33 ("address setting" in the step S80), the CPU 13 drives the operation panel 15 to display the screen 41 of the address book again, to obtain an address (step S73). Subsequently, the same processes as those described above are performed. Further, when the user presses the address deletion button 39 ("address deletion" in the step S80), the address set with the operation panel 15 immediately before pressing the button 39, or the address lastly displayed, is deleted (step S81). Further, when the user presses the data transmission button 32 ("data transmission" in the step S80), the image data is transmitted by the NIC 14 to all the addresses displayed in the already-set address display part 35 (step S82), to complete the processing.

Figure 17:
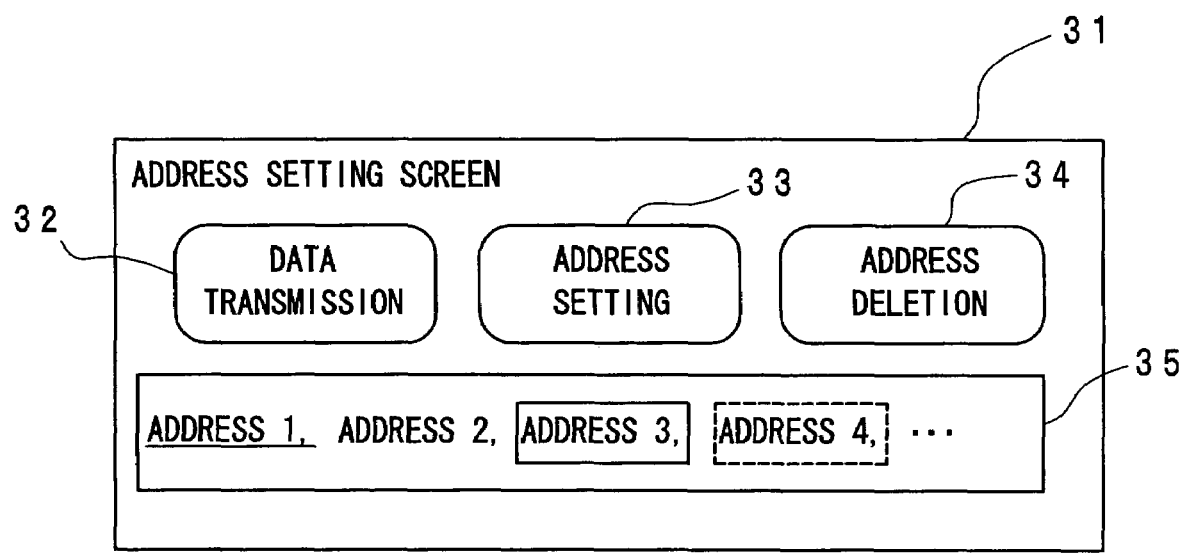
FIG. 17 is a diagram of another example of the address setting screen 31 displayed on the operation panel 15.

FIG. 17 shows one example of the address setting screen 31 displayed in the case where processes are performed according to the flowchart shown by FIGS. 15 and 16. It is assumed here that the administrator of the image processing apparatus 3 presets attributes of addresses and colors for displaying the addresses having those attributes as follows: blue for "Tokyo branch office", green for "Osaka branch office", and red for "extra-company". When the user sets an address 1 having the attribute "Tokyo branch office", the address 1 is displayed with blue characters (underlined characters in FIG. 17) in the already-set address display part 35. Further, when the user sets an address 2 having an attribute "others", which is not present in the second table, the address 2 is displayed with black characters in the already-set address display part 35. When the user sets an address 3 having the attribute "extra-company", the address 3 is displayed with red characters (circled by the solid line in FIG. 17) in the already-set address display part 35. When the user sets an address 4 having the attribute "Osaka branch office", the address 4 is displayed with green characters (circled by the broken line in FIG. 17) in the already-set address display part 35. As thus described, since the addresses are displayed on the same screen in a different manner depending on the attributes-thereof, the user can be readily informed of each attribute of the addresses, and therefore easily find an address setting error. That is, the user can correct the address setting error before transmitting the data.

It is to be noted that, although the administrator of the image processing apparatus or some others presets the second table in the image processing apparatus according to the embodiment 2, the user may set the second table after login, as described in the embodiment 1. Further, the user may add a new relationship between an attribute of an address and a color for displaying the address having the attribute, to the second table preset by the administrator or some others.

Embodiment 3

In an image processing apparatus according to an embodiment 3, when the user sets a plurality of addresses, attributes of all the addresses set by the user are determined on, and, with respect to each of the attributes, a ratio of the number of addresses having the attribute to the total number of the addresses set by the user is calculated. When there are present both a first attribute with the above calculated ratio not less than a predetermined ratio and a second attribute with the above calculated ratio less than the predetermined ratio, an address having the first attribute is determined as an address to which the image data is to be transmitted, and an address having the second attribute is determined as an address to which the image data is not to be transmitted.

Figure 18:
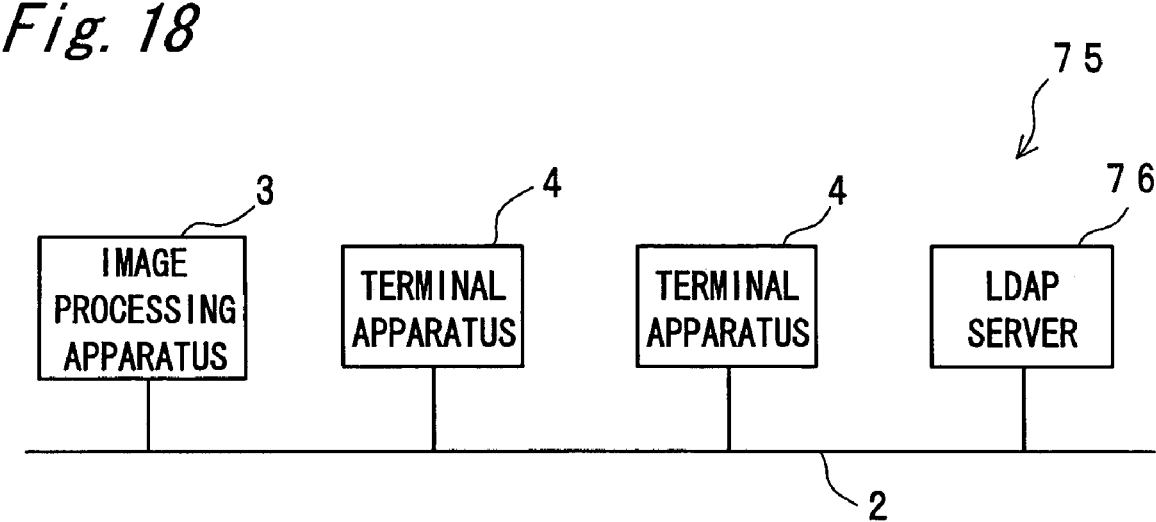
FIG. 18 is a block diagram of one configuration example of an image processing system including an image processing apparatus according to an embodiment 3 of the present invention.

FIG. 18 is the block diagram showing a configuration example of an image processing system including an image processing apparatus according to the embodiment 3 of the present invention. In FIG. 18, the same components as those in the image processing system 1 in FIG. 1 are provided with the same reference numerals, and description of those components is omitted. An image processing system 75 in FIG. 18 differs from the image processing system 1 in FIG. 1 in that a light weight directory access protocol server (hereinafter referred to as "LDAP server") 76 is connected to the network 2.

Figure 19:
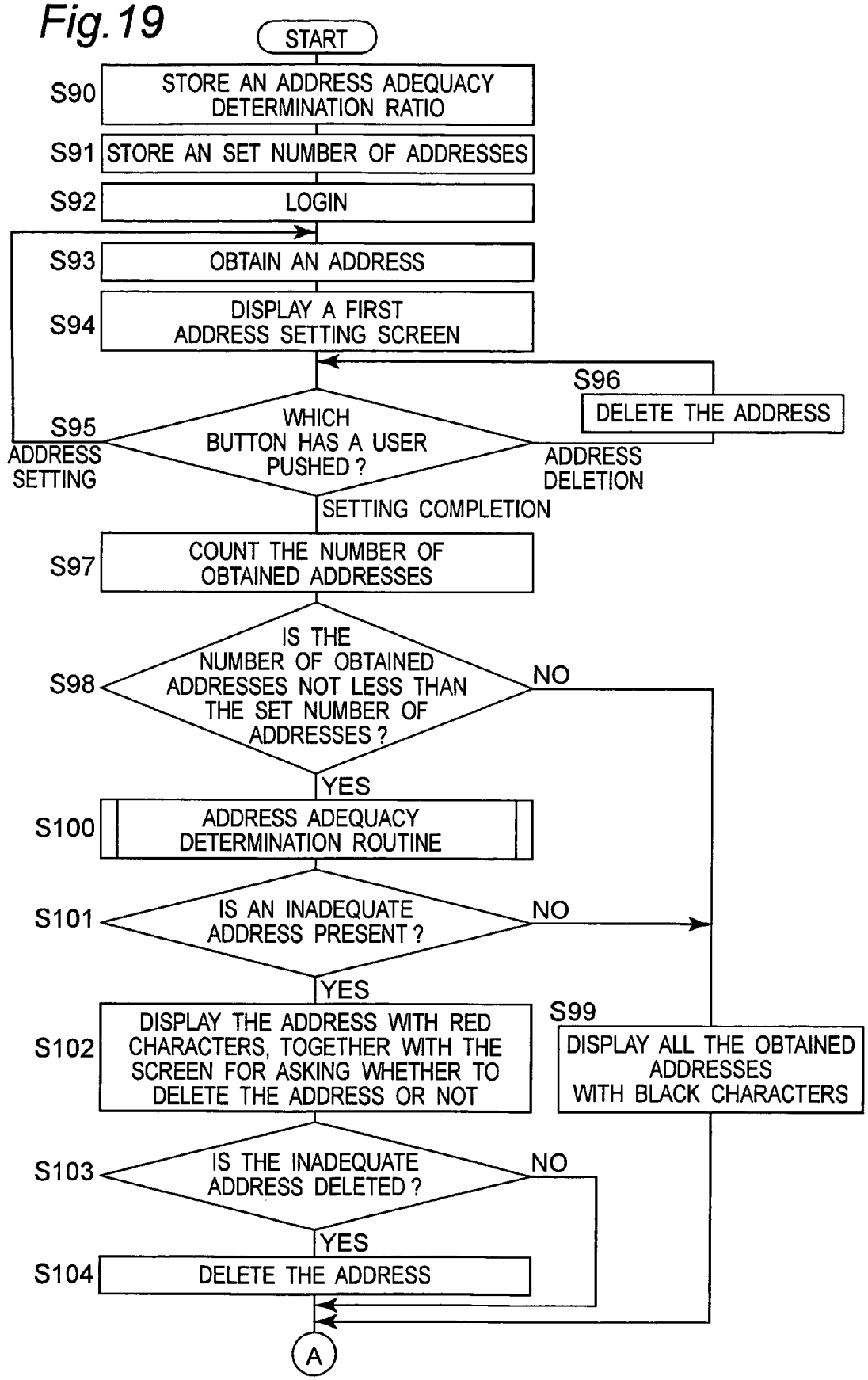
FIG. 19 is a part of a flowchart of a control flow of the CPU 13 of the image processing apparatus according to the embodiment 3 in the case where the user has set an address.
Figure 20:
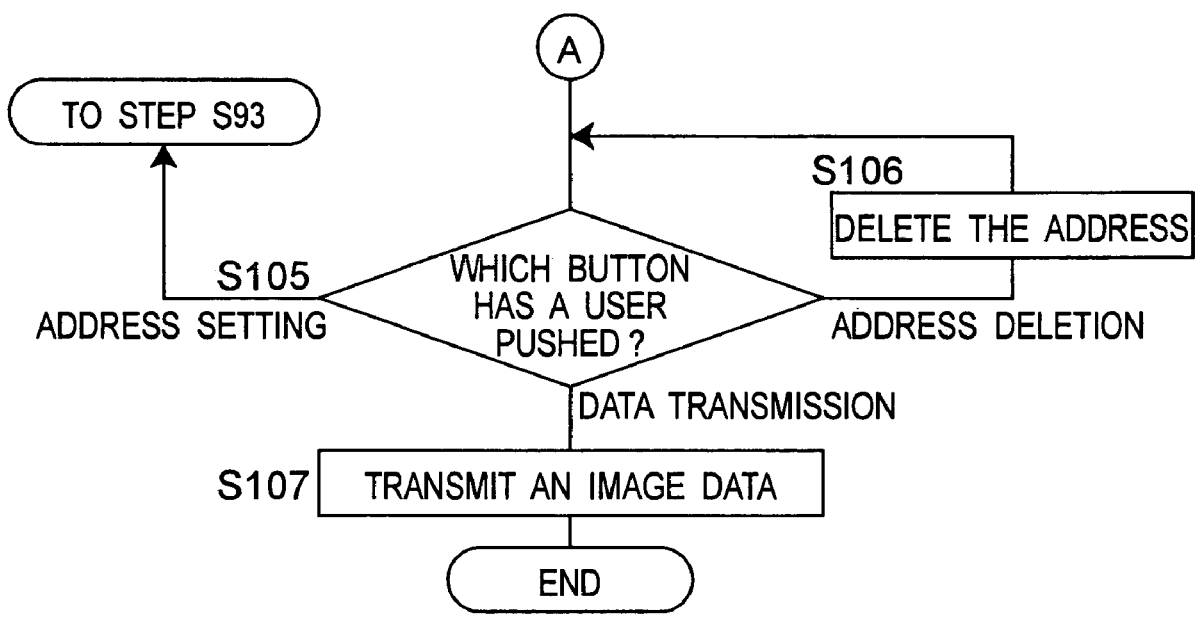
FIG. 20 is a part of a flowchart of a control flow of the CPU 13 of the image processing apparatus according to the embodiment 3 in the case where the user has set an address.
Figure 21:
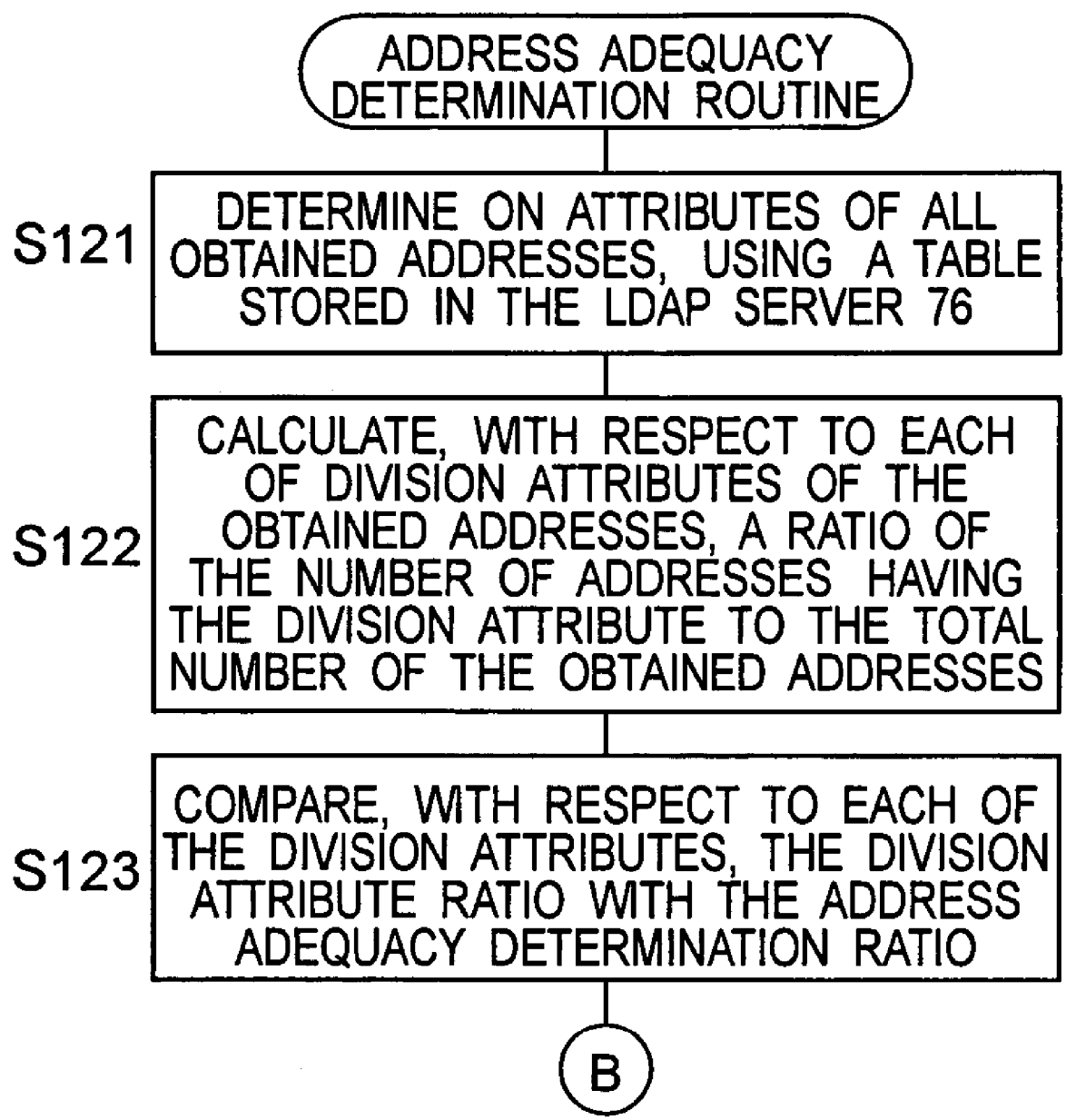
FIG. 21 is a part of a flowchart of an address adequacy determination routine.
Figure 22:
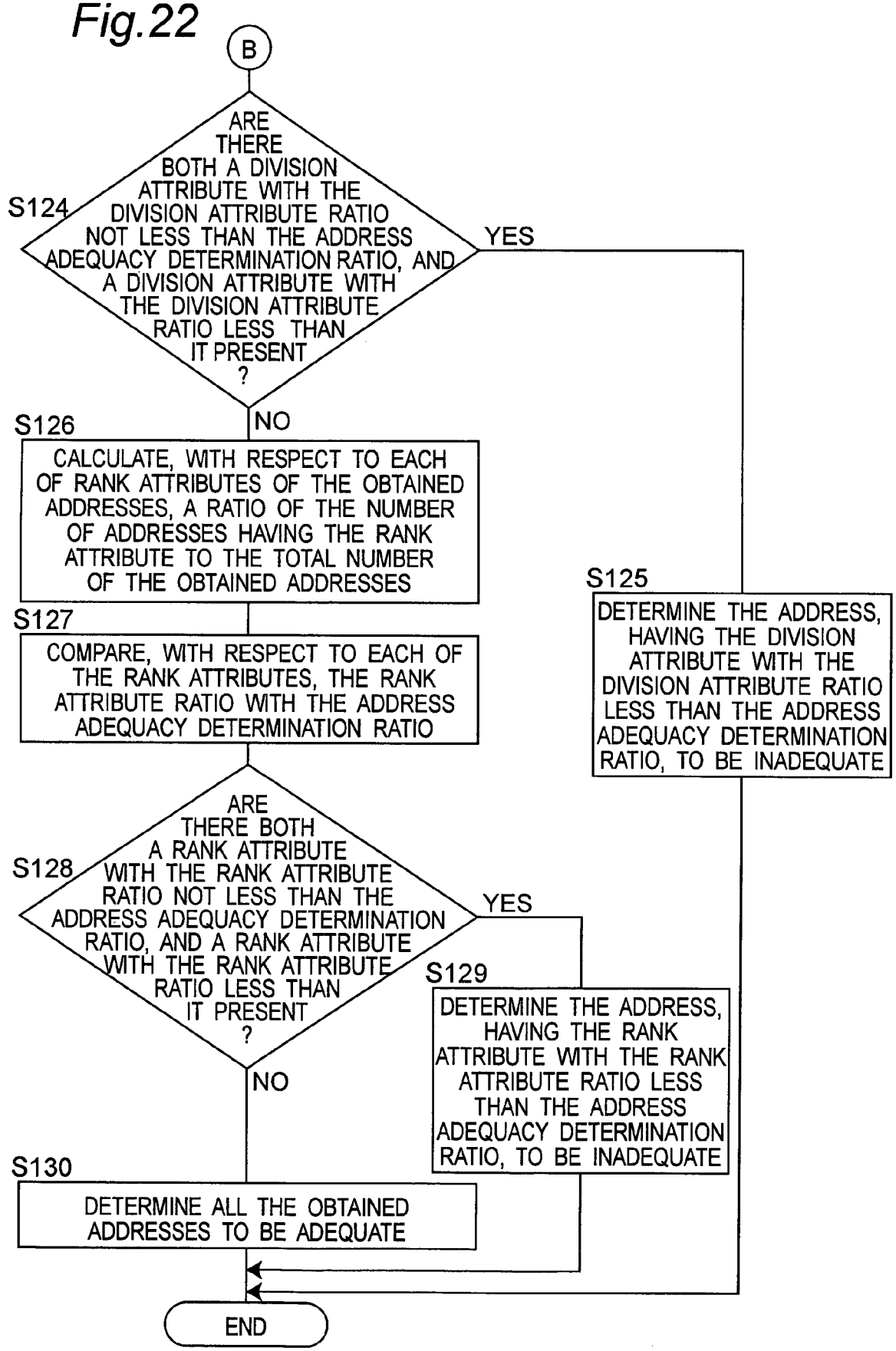
FIG. 22 is a part of a flowchart of an address adequacy determination routine.

FIG. 19 as well as FIG. 20 is a flowchart showing a control flow of the CPU 13 in the case where the user determines whether a plurality of addresses set by the user are correct. FIG. 21 as well as FIG. 22 is a flowchart showing an address adequacy determination routine in the step S100 in FIG. 19. First, the administrator of the image processing apparatus 3 or some others presets two set values, namely the set number of addresses and an adequacy determination ratio, for determining the adequacy of an address set by the user, in the image processing apparatus 3, using the operation panel 15. Specifically, as shown in FIG. 19, when the administrator of the image processing apparatus 3 inputs the set number of addresses and the address adequacy determination ratio with the operation panel 15, the CPU 13 drives the hard disk (described as "HD" in FIG. 19) 16 to store the set number of addresses and the address adequacy determination ratio (steps S90, S91). Subsequently, when the user presses a login button on the operation panel 15 and inputs a password and the like (step S92), the CPU 13 drives the operation panel 15 to display a first address setting screen (step S94).

Figure 23:
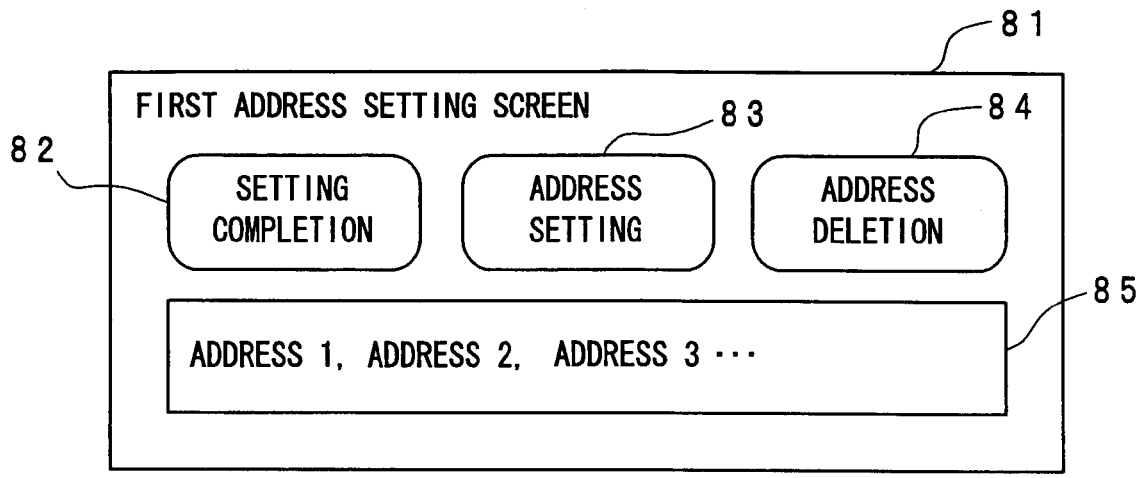
FIG. 23 is a diagram of one example of a first address setting screen displayed on the operation panel 15.

FIG. 23 shows one example of the above-mentioned first address setting screen. As shown in FIG. 23, this first address setting screen 81 has a setting completion button 82, an address setting button 83, an address deletion button 84, and an already-set address display part 85. The user uses this first address setting screen 81 to perform operations of setting of an address, deletion of an address, and issuing of an address setting completion command. When the user presses the address setting button 83, the screen on the operation panel 15 is switched to the screen 41 of an address book as shown in FIG. 6, and the user selects an address from the address book. When the address is selected from the address book, the screen on the operation panel 15 is shifted to the first address setting screen 81, where the address selected on the screen 41 of the address book is displayed in the already-set address display part 85. When the user presses the setting completion button 82, the processes mentioned later are performed. When the user presses the address deletion button 84, one address, lastly set among addresses displayed in the already-set address display part 85, is deleted.

In FIG. 19, when the CPU 13 drives the operation panel 15 to display the first address setting screen 81 (step S94), the user selects any of the setting completion button 82, the address setting button 83, and the address deletion button 84. When the user presses the address setting button 83 ("address setting" in the step S95), a corresponding predetermined control signal is produced, to be detected by the CPU 13. With the detection of this control signal, the CPU 13 drives the operation panel 15 to display the screen 41 of the address book. The CPU 13 starts the processing again from the step S93. Further, when the user presses the address deletion button 84 ("address deletion" in the step S95), a corresponding predetermined control signal is produced, to be detected by the CPU 13. With the detection of this control signal, the CPU 13 drives the operation panel 15 to delete an address set immediately before pressing the button (step S96). When the user presses the setting completion button 82, ("setting completion" in the step S95), a corresponding predetermined control signal is produced, to be detected by the CPU 13. With this detection, the processing goes to the next step S97.

The CPU 13 counts the number of addresses set by the user, that is, obtained by the CPU 13, in the step 97 (step S97). The counted number of the obtained addresses is then compared with the set number of addresses stored in the hard disk 16 (step S98). When the counted number of the obtained addresses is less than the set number of addresses (No in the step S98), the CPU 13 drives the operation panel 15 to display all the obtained addresses with black characters (step S99). On the other hand, when the counted number of the obtained addresses is not less than the set number of addresses (YES in the step S98), the processing goes into an address adequacy determination routine, and it is determined whether all the set addresses are adequate (step S100).

When determining that all the addresses are adequate, that is, no inadequate address is present, in the address adequacy determination routine (No in the step S101), the CPU 13 drives the operation panel 15 to switch the screen thereon from the first address setting screen 81 to a second address setting screen, and display all the addresses with an unchanged color characters, namely black characters (step S99). On the other hand, when determining that an inadequate address is present in the address adequacy determination routine (YES in the step S101), the CPU 13 drives the operation panel 15 to switch the screen thereon from the first address setting screen 81 to the second address setting screen, and display all the addresses with an unchanged color characters, except the address determined to be inadequate displayed with characters of a changed color such as red (step S102). Such a display can inform the user that an address, having an unnaturally different attribute from the other addresses, is present in the plural addresses set by the user.

Figure 24A:
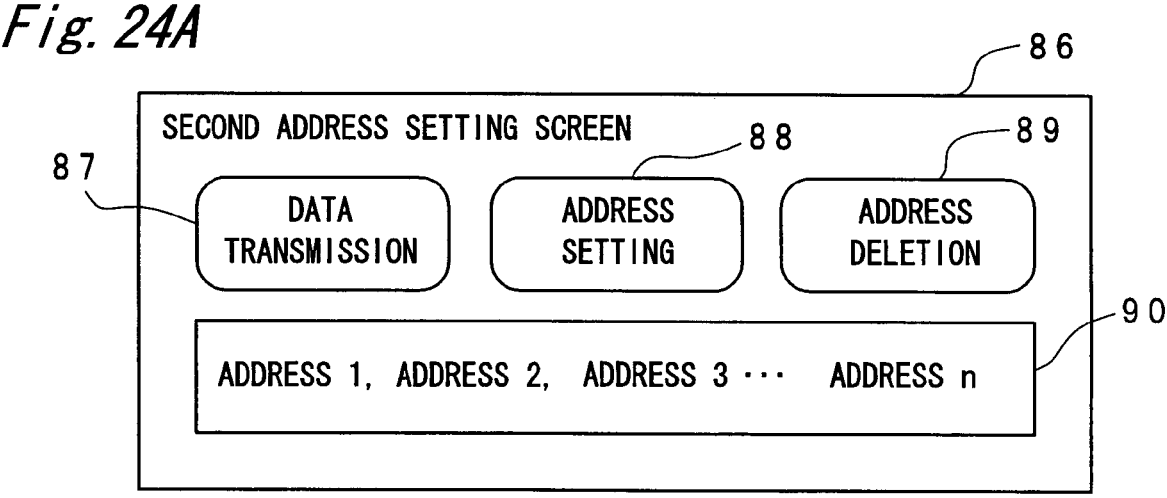
FIG. 24A is a diagram of one example of second address setting screen displayed on the operation panel 15 when all addresses are determined to be adequate.
Figure 24B:
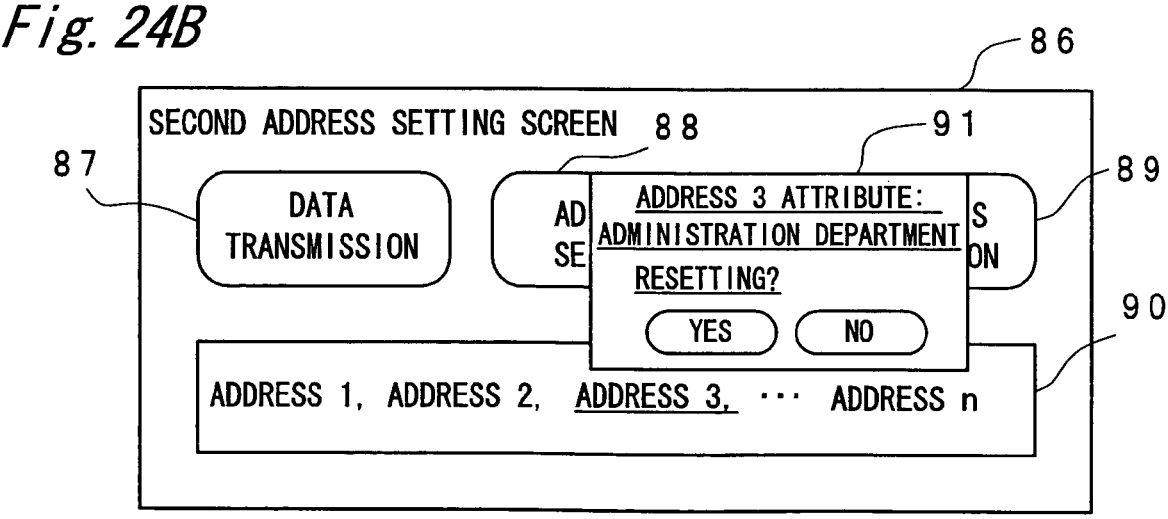
FIG. 24B is a diagram of one example of second address setting screen displayed on the operation panel when an inadequate address is present.

FIGS. 24A and 24B show one example of the above-mentioned second address setting screen. FIG. 24A is a screen displayed when all the addresses set by the user are determined to be adequate. FIG. 24B is a screen displayed when an inadequate address is present. As shown in FIGS. 24A and 24B, a second address setting screen 86 has a data transmission button 87, an address setting button 88, an address deletion button 89, and an already-set address display part 90. When it is determined that all the addresses are adequate in the step S101 in FIG. 19, all the addresses are displayed with black characters in the already-set address display part 90, as shown in FIG. 24A. On the other hand, when it is determined that an inadequate address is present, as shown in FIG. 24B, the address determined to be inadequate is displayed with characters of a changed color (underlined characters in FIG. 24B), and a deletion selecting screen 91 is also displayed in the already-set address display part 90. On the deletion selecting screen 91, the user selects whether the address determined to be inadequate is deleted or not. When the user presses the "YES" button, that is, selects to delete the address setting, on the deletion selecting screen 91, all the addresses displayed with characters of the changed color are deleted. When the user presses the "NO" button, that is, selects not to delete the address setting, the addresses displayed with characters of the changed color remains displayed on the already-set address display part 90 while the deletion selecting screen 91 is deleted on the second address setting screen 86.

As thus described, when determining that an inadequate address is present in the address adequacy determination routine (YES in the step S101), the CPU 13 drives the operation panel 15 to display the second address setting screen 86 as shown in FIG. 24B. On the second address setting screen 86, an address determined to be inadequate is displayed with characters of red or the like, and the deletion selecting screen 91 is also displayed (step S102). On the deletion selecting screen 91, the user selects whether to delete the address determined to be inadequate or not. Herein, when the user presses the "YES" button (YES in the step S103), the CPU 13 drives the operation panel 15 to delete the address determined to be inadequate (step S104), and the processing goes to the next step S105. When the user presses the "NO" button (NO in the step "S103"), the address determined to be inadequate remains displayed, and the processing goes to the next step In seeing the already-set address display part 90 on the second address setting screen 86, the user selects any of the data transmission button 87, the address setting button 88, and the address deletion button 89. When the user presses the address setting button 88 ("address setting" in the step S105), the CPU 13 drives the operation panel 15 to display the screen 41 of the address book. As the user inputs an address again, the CPU 13 starts the processing again from the step S93. When the user presses the address deletion button 89 ("address deletion" in the step S105), the CPU 13 drives the operation panel 15 to delete one address, which was set lastly, in the already-set address display part 90 (step S106). When the user presses the data transmission button 87 ("data transmission" in the step S105), the image data is transmitted by the NIC 14 to all the addresses displayed in the already-set address display part 90 (step S107), to complete the processing.

The address adequacy determination routine is described in detail below. In the address adequacy determination routine shown by FIGS. 21 and 22, the CPU 13 first determines on attributes of all obtained addresses, using a table stored in the LDAP server 76 (step S121). Next, with respect to each of division attributes of the addresses set by the user, the CPU 13 counts the number of addresses having the division attribute, and then calculates a ratio (hereinafter referred to as "division attribute ratio") of the number of addresses having the division attribute to the total number of the obtained addresses (step S122). Next, the CPU 13 compares, with respect to each of the division attributes, the division attribute ratio with the address adequacy determination ratio set by the administrator of the image processing apparatus 3 (step S123). Herein, when there are present both a division attribute with the division attribute ratio not less than the address adequacy determination ratio, and a division attribute with the division attribute ratio less than the address adequacy determination ratio (YES in the step S124), the CPU 13 determines the address, having the division attribute with the division attribute ratio less than the address adequacy determination ratio, to be inadequate (step S125), to complete the address adequacy determination routine. When there are not present both the division attribute with the division attribute ratio not less than the address adequacy determination ratio, and the division attribute with the division attribute ratio less than the address adequacy determination ratio, namely there is present either of those attributes (NO in the step S124), the CPU 13 counts, with respect to each of rank attributes of the addresses, the number of addresses having the rank attribute, and then calculates a ratio (hereinafter referred to as "rank attribute ratio") of the number of addresses having the rank attribute to the total number of the obtained addresses (step S126). Next, the CPU 13 compares, with respect to each of the rank attributes, the rank attribute ratio with the address adequacy determination ratio set by the administrator of the image processing apparatus 3 (step S127). Herein, when there are present both a rank attribute with the rank attribute ratio not less than the address adequacy determination ratio, and a rank attribute with the rank attribute ratio less than the address adequacy determination ratio (YES in the step S128), the CPU 13 determines the address, having the rank attribute with the rank attribute ratio less than the address adequacy determination ratio, to be inadequate (step S129), to complete the address adequacy determination routine. On the other hand, when there are not present both the rank attribute with the rank attribute ratio not less than the address adequacy determination ratio, and the rank attribute with the rank attribute ratio less than the address adequacy determination ratio, namely there is present either of those attributes (NO in the step S128), the CPU 13 determines all the obtained addresses to be adequate (step s130), to complete the address adequacy determination routine.

For example, as shown in FIG. 24B, when the user sets an address 1 to an address "n", and only an address 3 has an attribute "general affairs department" while the other addresses have an attribute "development department", only the address 3 is displayed with red characters (underlined characters in FIG. 24B) in the already-set address display part 90. Further, on the second address setting screen 86, the attribute of the address 3 and the screen 91 for asking whether to delete the address 3 or not, on which the user is to select whether the setting is deleted or not, are displayed. When the user selects "YES" on the screen 91, the address 3 is deleted on the already-set address display part 90. When the user selects "NO" on the screen 91, the address 3 remains displayed. Accordingly, in the case where the user sets a plurality of addresses including, for example, only one address having a different attribute from the other addresses, this address is displayed in a different manner from the other addresses. In the case of having set only one wrong address, it is thus possible for the user to easily notice the error. This allows the image processing apparatus according to the embodiment 3 to prevent transmission of the image data to a totally unrelated address due to an address setting error by the user. It is to be noted that, when all the addresses set by the user have the same attribute, "NO" is selected both in the step S124 and in the step S128, leading to determination on all the addresses as adequate (step S130). Although the division and rank are used as the attributes for determining the adequacy in the embodiment 3, other attributes (intra-company, place of business etc.) may be employed for the determination.

In the following, the two set values, namely the set number of addresses and the address adequacy determination ratio, preset by the administrator of the image processing apparatus 3 in the steps S90 and S91 in FIG. 19, are described.

A. Set Number of Addresses

The set number of addresses is stored in the hard disk 16, and is used when the CPU 13 determines whether to go into the address adequacy determination routine. When the number of addresses set by the user is not less than the set number of addresses, the CPU 13 goes into the address adequacy determination routine. Otherwise, that is, when the number of the addresses set by the user is less than the set number of addresses, the CPU 13 does not go into the address adequacy determination routine. Herein, in the case where a large number of addresses are stored in an address book, there expected to be many similar names in the address book, making it increasingly possible for the user to make an error in selecting an address from the address book. Therefore, when a large number of addresses are stored in the address book, the set number of addresses needs to be set low, e.g. five. On the contrary, when a small number of addresses are stored in the address book, the number of the addresses may be set high, e.g. ten.

B. Address Adequate Determination Routine

The address adequacy determination ratio is a value used for determining whether there is any inadequate address among the addresses set by user in the address adequacy determination routine, and is stored in the hard disk 16. For example, in the case where the address adequacy determination ratio is set to 80 percent (%), determination is "YES" in the step S124 in FIG. 22, when there are present both a division attribute, with the address adequacy determination ratio (of the number of addresses having the same division attribute to the total number of addresses set by the user) not less than 80%, and a division attribute, with which the address adequacy determination ratio less than 80%, and otherwise, the determination is "NO" in the step S124 in FIG. 22.

It should be noted that, although the image processing apparatus 3 according to the embodiment 3 determines the attributes of all the obtained addresses, using the table stored in the LDAP server 76 (step S121), the table may be previously stored in the hard disk 16 of the image processing apparatus 3, and used when attributes are determined. Further, although each of the image processing apparatuses 3 of the embodiments 1 and 2 previously stores the table indicating relationships between addresses and attributes of the addresses, and determined the attribute of the address set by the user using this previously stored table, such a table may be stored in the LDAP server 76, and the attribute of the address may be determined by reference to the table stored in the LDAP server 76.

It will be obvious to those having skill in the art that many changes may be made in the above-described details of the preferred embodiments of the present invention. The scope of the present invention, therefore, should be determined by the following claims.

What is claimed is:

1. An image processing apparatus which transmits image data to a plurality of addresses via a network, the apparatus comprising:
   a transmission device which transmits the image data to an address in said plurality of addresses;
   an address setting device which sets at least two of said plurality of addresses as destination addresses for transmission of the image data;
   a first storage device that stores attributes for the plurality of addresses;
   an obtaining device that obtains the attributes of the destination addresses from the first storage device;
   a determining device that calculates, based on the obtained attributes, a first ratio representing a proportion of the destination addresses having a first attribute and a second ratio representing a proportion of the destination addresses having a second attribute, and determines whether the first ratio is greater than both a predetermined ratio and the second ratio;
   a display device which displays a first destination address having the first attribute, and a second destination address having the second attribute on the same screen, in different manners from each other when the determining device determines that the first ratio is greater than both the predetermined ratio and the second ratio.

2. The image processing apparatus according to claim 1, further comprising a second storage device which stores a predetermined number, wherein said determining device only calculates the first and second ratios when the total number of destination addresses is at least as great as the predetermined number.

3. The image processing apparatus according to claim 1, wherein said display device displays said second destination address, together with an attribute thereof.

4. The image processing apparatus according to claim 1, further comprising a deletion device which deletes said second destination address displayed by said display device when a predetermined first control signal is input from the outside, wherein said transmission device transmits the image data to an address displayed by said display device among said plurality of addresses when a predetermined second control signal is input from the outside.

5. An image processing method performed in an image processing apparatus which transmits image data to a plurality of addresses via a network, the method comprising:

obtaining inputs to set at least two of said plurality of addresses as destination addresses for transmission of the image data;

storing in a first storage device attributes corresponding to the plurality of addresses;

obtaining attributes of the destination addresses from the first storage device;

calculating, based on the obtained attributes, a first ratio representing a proportion of the destination addresses having a first attribute and a second ratio representing a proportion of the destination addresses having a second attribute, and determining whether the first ratio is greater than both a predetermined ratio and the second ratio; and upon determining that the first ratio is greater than both the predetermined ratio and the second ratio, displaying a first destination address having the first attribute, and a second destination address having the second attribute on the same screen, in different manners from each other.

6. The image processing method according to claim 5, further comprising:

storing a predetermined number, wherein said calculating is performed only when the total number of the at least two of said plurality of addresses is at least as great as the predetermined number.

7. The image processing method according to claim 5, wherein in said displaying step, said second destination address is displayed, together with attribute thereof.

8. The image processing method according to claim 5, further comprising:

deleting said second destination address when a predetermined first control signal is input from the outside; and transmitting the image data to the first destination address when a predetermined second control signal is input from the outside.

* * * * *